US012757883B1

(12) United States Patent
Zhong et al.

(10) Patent No.: US 12,757,883 B1
(45) Date of Patent: Oct. 13, 2026

(54) MOSQUITO KILLER WITH LIGHT EMITTING ASSEMBLY

(71) Applicants: SHENZHEN ANDELIAN TECHNOLOGY CO., LTD., Shenzhen (CN); ZHONGSHAN YONGQI ELECTRONIC TECHNOLOGY CO., LTD., Zhongshan (CN)

(72) Inventors: Shaohua Zhong, Shenzhen (CN); Shaoqi Ji, Zhongshan (CN)

(73) Assignees: SHENZHEN ANDELIAN TECHNOLOGY CO., LTD., Shenzhen (CN); ZHONGSHAN YONGQI ELECTRONIC TECHNOLOGY CO., LTD., Zhongshan (CN)

(*) Notice: Subject to any disclaimer, the term of this patent is extended or adjusted under 35 U.S.C. 154(b) by 0 days.

(21) Appl. No.: 19/417,563

(22) Filed: Dec. 12, 2025

(30) Foreign Application Priority Data

Nov. 27, 2025 (CN) ........................ 202522528306.0

(51) Int. Cl.

| | |
|---|---|
| ***A01M 1/22*** | (2006.01) |
| ***A01M 1/04*** | (2006.01) |
| ***F21S 9/03*** | (2006.01) |
| ***F21V 3/00*** | (2015.01) |
| ***F21V 21/08*** | (2006.01) |
| *F21Y 113/10* | (2016.01) |
| *F21Y 115/10* | (2016.01) |

(52) U.S. Cl.
CPC .............. *A01M 1/223* (2013.01); *A01M 1/04* (2013.01); *F21S 9/037* (2013.01); *F21V 3/00* (2013.01); *F21V 21/0824* (2013.01); *F21Y 2113/10* (2016.08); *F21Y 2115/10* (2016.08)

(58) Field of Classification Search
CPC .. A01M 2200/012; A01M 1/223; A01M 1/04; A01M 1/145; A01M 1/2016; A01M 1/2066; A01M 1/08; A01M 1/2083; F21S 9/037; F21V 3/00; F21V 21/0824; F21Y 2113/10; F21Y 2115/10
USPC .................................................... 43/144, 113
See application file for complete search history.

(56) References Cited

U.S. PATENT DOCUMENTS

| | | | | |
|---|---|---|---|---|
| 2,132,371 A * | 10/1938 | Kriwat | A01M 1/02 | 43/112 |
| 4,226,043 A * | 10/1980 | Peterson | A01M 1/223 | 43/112 |
| 4,654,998 A * | 4/1987 | Clay | A01M 1/145 | 43/115 |
| 5,184,417 A * | 2/1993 | Weldon | A01M 1/106 | 43/107 |

(Continued)

*Primary Examiner* — Maria E Graber

(74) *Attorney, Agent, or Firm* — HOWARD M COHN and Associates, LLC

(57) ABSTRACT

A mosquito killer includes a housing providing a lampshade and a base with transparency, the lampshade providing a first accommodating chamber, the base being arranged at a bottom of the lampshade. The light emitting assembly includes a first circuit board, a mosquito trap lamp, and a light emitting unit, wherein at least a portion of the first circuit board is located within the first accommodating chamber, the mosquito trap lamp is mounted on the first circuit board and is capable of emitting light of a predetermined wavelength to attract mosquitoes, the light emitting unit is located in the base and is used to emit projection light towards the base to form a projection lamp effect.

15 Claims, 31 Drawing Sheets

(56) References Cited

U.S. PATENT DOCUMENTS

| | | | | | |
|---|---|---|---|---|---|
| 5,301,458 | A * | 4/1994 | Deyoreo | A01M 1/04 | 43/112 |
| 6,134,826 | A * | 10/2000 | Mah | A01M 1/223 | 43/99 |
| 8,028,467 | B2 * | 10/2011 | Bagnall | A01M 1/106 | 43/107 |
| 10,045,521 | B2 * | 8/2018 | Zheng | H05C 1/06 | |
| 10,905,111 | B2 * | 2/2021 | Zhang | F04D 29/644 | |
| 11,160,267 | B2 * | 11/2021 | Saboo | F21L 4/025 | |
| 11,432,540 | B1 * | 9/2022 | Draeger | A01M 1/04 | |
| 11,771,073 | B2 * | 10/2023 | Smith | A01M 1/023 | 43/132.1 |
| 11,825,580 | B2 * | 11/2023 | Li | A01M 1/226 | |
| 12,274,254 | B2 * | 4/2025 | Li | A01M 1/04 | |
| 12,290,062 | B2 * | 5/2025 | Zheng | A01M 1/223 | |
| 12,302,884 | B2 * | 5/2025 | Zheng | A01M 1/04 | |
| 12,465,038 | B2 * | 11/2025 | Kelley | A01M 1/04 | |
| 12,510,213 | B1 * | 12/2025 | Li | F21K 9/237 | |
| 2004/0159040 | A1 * | 8/2004 | Chen | A01M 1/223 | 43/112 |
| 2005/0174769 | A1 * | 8/2005 | Yong | F21K 9/232 | 362/249.05 |
| 2010/0071254 | A1 * | 3/2010 | Calkins | A01M 1/145 | 43/107 |
| 2010/0124061 | A1 * | 5/2010 | Yen | F21K 9/232 | 362/253 |
| 2012/0049732 | A1 * | 3/2012 | Chuang | F21V 29/83 | 315/32 |
| 2014/0146570 | A1 * | 5/2014 | Lu | F21K 9/232 | 362/647 |
| 2014/0352200 | A1 * | 12/2014 | Tremble | A01M 1/223 | 43/112 |
| 2016/0037602 | A1 * | 2/2016 | Nicholls | F21K 9/232 | 307/64 |
| 2018/0199563 | A1 * | 7/2018 | Zheng | A01M 1/106 | |
| 2020/0107534 | A1 * | 4/2020 | Zheng | A01M 1/08 | |
| 2021/0153493 | A1 * | 5/2021 | Zhang | A01M 1/08 | |
| 2022/0248654 | A1 * | 8/2022 | Howland | A01M 1/08 | |
| 2023/0292728 | A1 * | 9/2023 | Zheng | A01M 1/04 | 43/112 |
| 2023/0309538 | A1 * | 10/2023 | Marcucci | A01M 1/223 | 43/114 |

* cited by examiner

MOSQUITO KILLER WITH LIGHT EMITTING ASSEMBLY

CROSS-REFERENCE TO RELATED APPLICATIONS

The present application claims a priority of Chinese patent application CN2025225283060, filed on Nov. 27, 2025, the entire disclosures of which are incorporated herein by reference.

TECHNICAL FIELD

The present application relates to the field of mosquito killer technology, particularly to a mosquito killer with light emitting assembly.

BACKGROUND

Mosquito killers are environmentally friendly devices utilizing the phototaxis of mosquitoes to trap and kill them through physical means such as electric shock from the electric grid. It can achieve mosquito control without the use of chemical agents, and is widely favored in the market.

However, due to its structural design, mosquito killers in related technologies usually use a single purple light to attract mosquitoes, resulting in limited mosquito killing function of the mosquito killer.

SUMMARY

This application provides a mosquito killer that can solve the problem that uses a single purple light to attract mosquitoes, resulting in limited mosquito killing function of the mosquito killer.

A mosquito killer comprises a housing including a lampshade and a base with transparency, the lampshade providing a first accommodating chamber, the base being arranged at a bottom of the lampshade. The light emitting assembly includes a first circuit board, a mosquito trap lamp, and a light emitting unit, wherein at least a portion of the first circuit board is located within the first accommodating chamber, the mosquito trap lamp is mounted on the first circuit board and is capable of emitting light of a predetermined wavelength to attract mosquitoes, the light emitting unit is located in the base and is used to emit projection light towards the base to form a projection lamp effect.

A mosquito killer comprises a housing including a lampshade and a shell with transparency, the lampshade providing a first accommodating chamber, the shell being arranged at a bottom of the lampshade. The light emitting assembly includes a first circuit board, a mosquito trap lamp, and a light emitting unit, wherein at least a portion of the first circuit board is located within the first accommodating chamber, the mosquito trap lamp is mounted on the first circuit board and is capable of emitting light of a predetermined wavelength to attract mosquitoes, the light emitting unit is located in the shell and is used to emit projection light towards the shell to form a projection lamp effect.

Based on the mosquito killer of this application, a mosquito trap lamp is designed to emit light of a preset wavelength to attract mosquitoes, causing them to approach the mosquito trap lamp and come into contact with the mosquito killer, and be killed by the current flowing therethrough. By designing a light emitting unit, the light emitting unit is used to emit projection light towards the base (in some embodiments, can be replaced by a transparent shell of the housing connected to the lampshade at side thereof) to form a projection lamp effect. In particular, visible projection light has higher brightness compared to the ultraviolet light of the mosquito trap lamp, which can be irradiated further. Therefore, the projection lamp effect can further attract more and farther mosquitoes to approach the mosquito killer due to the visible projection light, and then be further attracted by the mosquito trap lamp to contact with an electric grid of the mosquito killer, and be killed by the current flowing through the electric grid of the mosquito killer. By designing mosquito trap lamp, and light emitting unit that produces projection lights, users can choose to turn on the mosquito trap lamp or the light emitting unit according to their actual needs to attract mosquitoes, as well as improve the effectiveness of obtaining projection lights and mosquito traps. Compared with current mosquito killers those use a single purple light to attract mosquitoes, the mosquito killing effect of the mosquito killer in this application is better.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure. Those of ordinary skill in the art can obtain other drawings based on these drawings without creative work.

DRAWING REFERENCES

Figure 1:
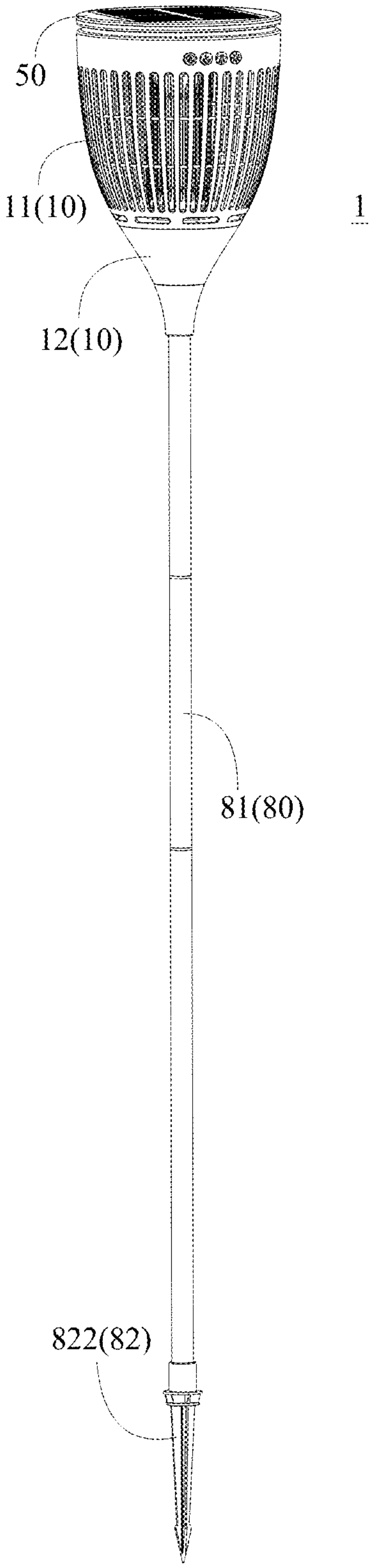
FIG. 1 is a schematic view of a mosquito killer according to a first embodiment of the present disclosure.

Elements and References: mosquito killer 1; housing 10; light emitting assembly 20; lampshade 11; first accommodating chamber 11*a*; second accommodating chamber 11*b*; grille 111; upper base 112; side panel 113; insertion hole 112*a*; first slot 112*b*; upper end panel 1121; through hole 1121*a*; mounting seat 1122; slot 1122*a*; lower base 114; second slot 114*a*; air inlet 114*b*; base 12; third accommodating chamber 12*a*; installation hole 12*b*; fixing seat 13; battery installation slot 13*a*; fan base 14; another diffusion cover 15; inner shell 16; light emitting assembly 20; first circuit board 21; mosquito trap lamp 22; flame lamp 23; clamping slot 21*a*; first sub circuit board 211; first plug interface 211*a*; second sub circuit board 212; second plug interface 212*a*; light emitting unit 24; third circuit board 241; ambient light 242; diffusion cover 25; second circuit board 30; motor 41; optical element 42; photovoltaic module 50; seat body 51; photovoltaic panel 52; energy storage battery 60; electric grid 70; positive electrode body 71; negative electrode body 72; connecting strip 73; positive electrode connecting part 711; positive electrode strip-shaped part 712; negative electrode strip-shaped part 722; support component 80; support column 81; grounding structure 82; U-shaped structure 821; M-shaped structure 827; grounding strips 822; first grounding component 823; second grounding component 824; main pin 8231; first L-shaped auxiliary pin 8232; external thread 8231*a*; first nut 8241; second L-shaped auxiliary pin 8242; third grounding component 825; U-shaped pin 8251; screw 825; fourth grounding component 826; third L-shaped auxiliary pin 8261; L-shaped auxiliary pin 8262; second nut 8263; automatic induction control switch 90; mosquito trap lamp switch 91; flame lamp switch 92; ambient light switch 93; power supply interface component 94; protective cap 95; fan body 96; collection box 97; flexible silicone cover 9*a*; installation hole 9*b*; optical unit 1201.

DETAILED DESCRIPTION OF THE EMBODIMENTS

The accompanying drawings in the embodiment of the present disclosure are combined, The technical scheme in the embodiment of the present disclosure is clearly and completely described, Obviously, the described embodiment is only a part of the embodiment of the present disclosure, but not all embodiments are based on the embodiment of the present disclosure, and all other embodiments obtained by ordinary technicians in the field on the premise of not doing creative work belong to the protection range of the present disclosure.

In order to make the above objectives, features, and advantages of the present application more obvious and understandable, the following will provide further detailed explanations of the present application in conjunction with the accompanying drawings and specific implementation methods.

First Embodiment

Referring to FIGS. 1-8, the first embodiment of the present application provides a mosquito killer 1, which includes a housing 10 and a light emitting assembly 20. The housing 10 comprises a lampshade 11, which forms a first accommodating chamber 11*a*. The light emitting assembly 20 includes a first circuit board 21, a mosquito trap lamp 22, and a flame lamp 23; the first circuit board 21 is connected to the lampshade 11 and at least partially located within the first accommodating chamber 11*a* of the lampshade 11; the mosquito trap lamp 22 is mounted on the first circuit board 21 and can emit light of a preset wavelength to attract mosquitoes; the flame lamp 23 is also mounted on the first circuit board 21 and is configured to be lit in a preset manner.

Further referring to FIGS. 9-21, the housing 10 is the outer shell of the entire mosquito killer 1, and the first accommodating chamber 11*a* is a hollow inner space of the lampshade 11. The specific structure of lampshade 11 will be introduced in the following text.

The light emitting assembly 20 serves as the light emitting module of the mosquito killer 1. The first circuit board 21 can be a rigid circuit board, a flexible circuit board, or a combination of a rigid circuit board and a flexible circuit board. It should be noted that when the first circuit board 21 is a flexible circuit board, the light emitting assembly 20 may also include a reinforcing plate, which is set on one side of the flexible circuit board to provide support for the flexible circuit board.

At least a portion of the first circuit board 21 is located within the first accommodating chamber 11*a* of the lampshade 11; for example, the entire first circuit board 21 can be located in the first accommodating chamber 11*a* of the lampshade 11, or a portion of the first circuit board 21 can be located in the first accommodating chamber 11*a* of the lampshade 11, and the remaining portion of the first circuit board 21 can be located in the second accommodating chamber 11*b* of the lampshade 11 (as described below).

The first circuit board 21 is connected to the lampshade 11; the specific connection method between the first circuit board 21 and the lampshade 11 is not limited here, and designers can make reasonable designs according to actual needs; for example, the first circuit board 21 can be, but is not limited to, detachably connected to the lampshade 11 through at least one of screw, card, or plug connections; for another example, the first circuit board 21 can also be connected to the lampshade 11 in a non-detachable manner, but not limited to, by adhesive bonding or riveting.

As shown in FIGS. 1-8, the mosquito trap lamp 22 is installed on the first circuit board 21 and electrically connected to it. The mosquito trap lamp 22 can emit light of a preset wavelength to attract mosquitoes. For example, the mosquito trap lamp 22 can emit ultraviolet light with a wavelength of approximately 350-400 nanometers (when the mosquito killer 1 is in the first mosquito trap lamp mode), which has a strong attraction to mosquitoes; for another example, the mosquito trap lamp 22 can also emit blue light with a wavelength of around 450 nanometers (when the mosquito killer 1 is in the second mosquito trap lamp mode), which has a strong attraction to mosquitoes; for further another example, the mosquito trap lamp 22 can also emit green or white light with a wavelength of 500-600 nanometers (at this time the mosquito killer 1 is in the third mosquito trap lamp mode), which has a certain attraction to mosquitoes. The light emitted by the mosquito lure lamp 22 is attractive to mosquitoes, causing them to approach the mosquito lure lamp 22 and come into contact with the electric grid 70 of the light emitting assembly 20 (as described below); they are then killed by the current flowing through the electric grid 70 of the light emitting assembly 20.

It should be noted that the mosquito killer 1 has a mosquito trap mode. The lampshade 11 (specifically the side panel 113 described below) is equipped with a mosquito trap lamp switch 91, which is electrically connected to the second circuit board 30 (described below). Users can operate the mosquito trap lamp switch 91 according to their actual needs to put the mosquito killer 1 in mosquito trap mode. Of course, when the mosquito killer 1 has multiple different mosquito trap light modes, users can switch the mosquito killer 1 between different mosquito trap light modes by operating the mosquito trap lamp switch 91 multiple times.

As shown in FIGS. 1-8, the flame lamp 23 is installed on the first circuit board 21 and electrically connected to it. The flame lamp 23 is configured to light up in a predetermined manner. Among them, the preset methods can include but are not limited to keeping the flame lamp 23 constantly on, flashing the flame lamp 23, etc. The light emitted by the flame lamp 23 can pass through the lampshade 11 (specifically the grille 111 described below) and be observed by users or others to create a flame like lighting effect created by the flame lamp 23.

The flame lamp 23 can be or can include one or more LED lamp group 23*a*, each of which includes at least one LED lamp 23*b*. The multiple LED lamp group 23*a* are arranged at intervals on the first circuit board 21, and the on/off and flashing of each LED lamp group 23*a* are controlled by the circuit. Combined with the light emission principle of the LED lamp itself, the dynamic effect of the flame is simulated.

Figure 7:
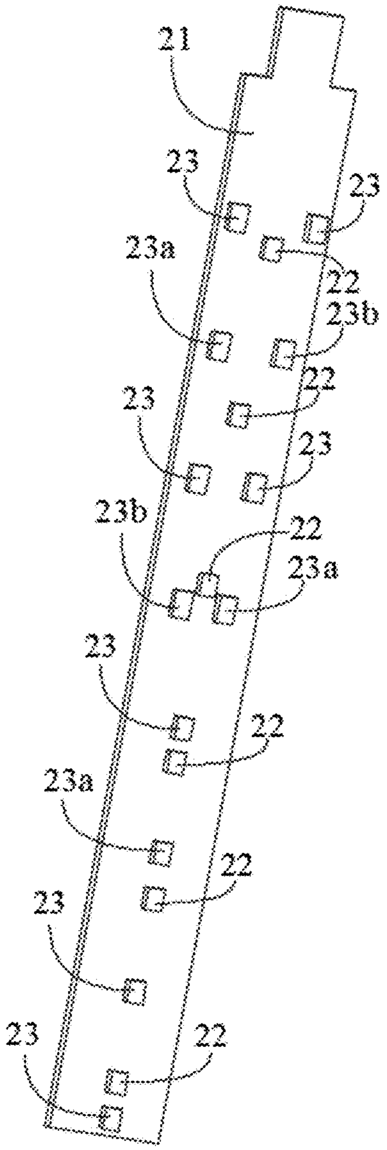
FIG. 7 shows the first circuit board according to a first embodiment of the present disclosure.
Figure 8:
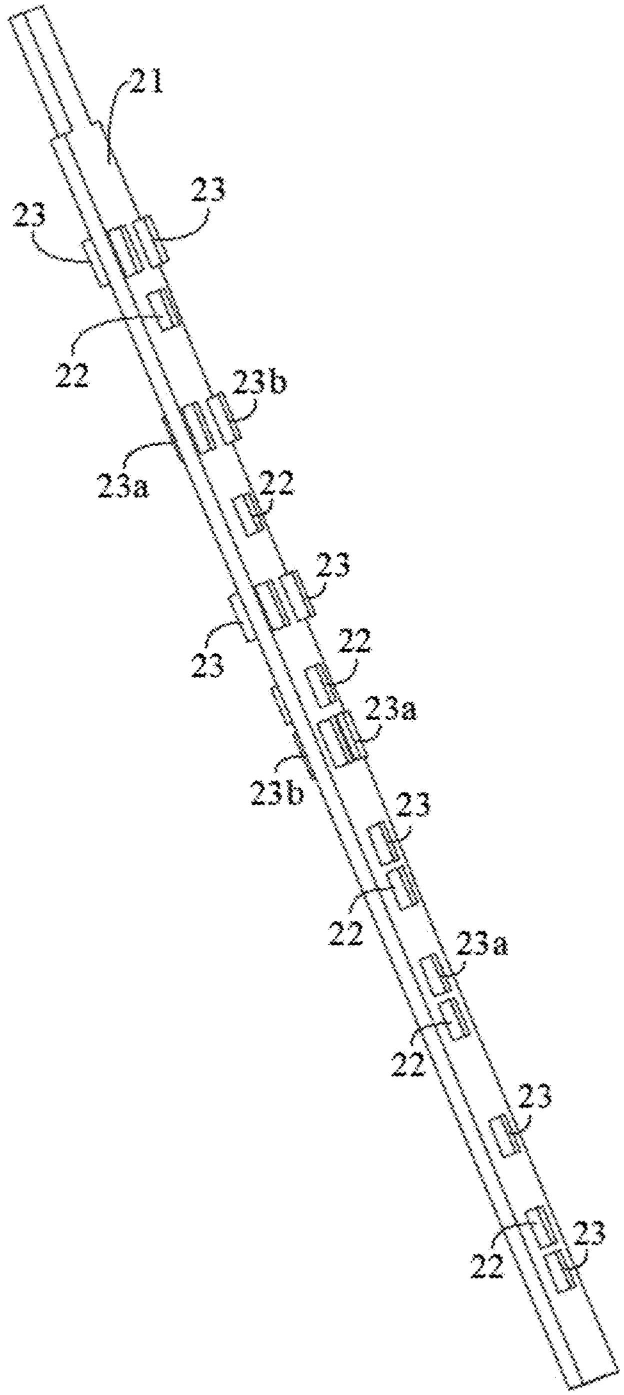
FIG. 8 is another view of the first circuit board of FIG. 7.

For example, as shown in FIGS. 7-8, the flame lamp 23 includes twelve LED lamp group 23*a*, each LED lamp group 23*a* includes two LED lamps 23*b*, and the two LED lamps 23*b* of each LED lamp group 23*a* are respectively arranged on the front and back of the first circuit board 21. For example, the twelve LED lamp group 23*a* include a first LED lamp group 23*a*, a second LED lamp group 23*a*, a third LED lamp group 23*a*, a fourth LED lamp group 23*a*, a fifth LED lamp group 23*a*, a sixth LED lamp group 23*a*, a seventh LED lamp group 23*a*, an eighth LED lamp group 23*a*, a ninth LED lamp group 23*a*, a tenth LED lamp group 23*a*, an eleventh LED lamp group 23*a*, and a twelfth LED lamp group 23*a* arranged at intervals.

The first LED lamp group 23*a*, second LED lamp group 23*a*, third LED lamp group 23*a*, and fourth LED lamp group 23*a* are used to form the first light emitting group; the fifth LED lamp group 23*a*, sixth LED lamp group 23*a*, seventh LED lamp group 23*a*, and eighth LED lamp group 23*a* are used to form the second light emitting group; and the ninth LED lamp group 23*a*, tenth LED lamp group 23*a*, eleventh LED lamp group 23*a*, and twelfth LED lamp group 23*a* are used to form the third light emitting group. The first light emitting group is located on the lower half area of the first circuit board 21, and the second and third light emitting groups are located on the upper half area of the first circuit board 21, symmetrically arranged about the length direction of the first circuit board 21. Twelve LED lamp group 23*a* are arranged in a Y-shaped pattern on the first circuit board 21.

In a first flame lamp mode, control the LED lamps 23*b* in the first LED group 23*a* to flash with a medium-brightness gradient, the LED lamps 23*b* in the second LED group 23*a* to flash with a low-brightness gradient, the LED lamps 23*b* in the third LED group 23*a* to flash (with gradient in the lit lamps), the LED lamps 23*b* in the fourth LED group 23*a* to flash (with gradient in the lit lamps), the LED lamps 23*b* in the fifth LED group 23*a* to flash (with gradient in the lit lamps), the LED lamps 23*b* in the sixth LED group 23*a* to flash (with gradient in the lit lamps), the LED lamps 23*b* in the seventh LED group 23*a* to flash (with gradient in the lit lamps), and the LED lamps 23*b* in the eighth LED group 23*a* to flash (with gradient in the lit lamps). Additionally, set the working cycle time of all eight LED groups to 1 second and the duty cycle frequency to 200 Hz. Therefore, by coordinating the LED lamps in the eight groups with different lighting states, a flame-like lighting effect is achieved.

In a second flame lamp mode, control the LED lamps 23*b* in the first LED lamp group 23*a* to flash with a medium-brightness gradient, control the LED lamps 23*b* in the second LED lamp group 23*a* to flash with a low-brightness gradient, control the LED lamps 23*b* in the third LED lamp group 23*a* to flash (with gradient in the lit lamps), control the LED lamps 23*b* in the fourth LED lamp group 23*a* to flash (with gradient in the lit lamps), control the LED lamps 23*b* in the ninth LED lamp group 23*a* to flash (with gradient in the lit lamps), control the LED lamps 23*b* in the tenth LED lamp group 23*a* to flash (with gradient in the lit lamps), control the LED lamps 23*b* in the eleventh LED lamp group 23*a* to flash (with gradient in the lit lamps), and control the LED lamps 23*b* in the twelfth LED lamp group 23*a* to flash (with gradient in the lit lamps). Additionally, set the working cycle time of the eight LED lamp group 23*a* to 1 second and the duty cycle frequency to 200 Hz. Therefore, by coordinating the LED lamps in the eight lamp groups to display different lighting states, a flame-like lighting effect is created.

In a third flame lamp mode, control the LED lamps 23*b* in the first LED lamp group 23*a* to flash with a medium-brightness gradient, the LED lamps 23*b* in the second LED lamp group 23*a* to flash with a low-brightness gradient, the LED lamps 23*b* in the third LED lamp group 23*a* to flash (with gradient in the lit lamps), the LED lamps 23*b* in the fourth LED lamp group 23*a* to flash (with gradient in the lit lamps), the LED lamps 23*b* in the fifth and ninth LED lamp group 23*a* to flash (with gradient in the lit lamps), the LED lamps 23*b* in the sixth and tenth LED lamp group 23*a* to flash (with gradient in the lit lamps), the LED lamps 23*b* in the seventh and eleventh LED lamp group 23*a* to flash (with gradient in the lit lamps), and the LED lamps 23*b* in the eighth and twelfth LED lamp group 23*a* to flash (with gradient in the lit lamps). Additionally, set the operating cycle time of the twelve LED lamp group 23*a* to 1 second and the duty cycle frequency to 200 Hz. Therefore, by coordinating the LED lamps in the twelve LED lamp group 23*a* to display different lighting states, a flame-like lighting effect is created.

For example, taking the flame lamp 23 as an example, the six LED lamp group 23*a* include the first LED lamp group 23*a*, the second LED lamp group 23*a*, the third LED lamp group 23*a*, the fourth LED lamp group 23*a*, the fifth LED lamp group 23*a*, and the sixth LED lamp group 23*a* arranged at intervals from bottom to top on the first circuit board 21. In the first flame lamp mode, control the LED lamps 23*b* in the first LED lamp group 23*a* to flash in a high-brightness gradient state, control the LED lamps 23*b* in the second LED lamp group 23*a* to flash in a medium-brightness gradient state, control the LED lamps 23*b* in the third LED lamp group 23*a* to flash (with gradient in the lit lamps), control the LED lamps 23*b* in the fourth LED lamp group 23*a* to flash (with gradient in the lit lamps), control the LED lamps 23*b* in the fifth LED lamp group 23*a* to flash (with gradient in the lit lamps), and control the LED lamps 23*b* in the sixth LED lamp group 23*a* to flash (with gradient in the lit lamps), and control the working cycle time of the six LED lamp group 23*a* to 1.08 seconds with a duty cycle frequency of 200 Hz. Therefore, by coordinating the LED lamps in different lighting states among the six LED lamp groups, a flame like lighting effect is created. In the second flame lamp mode, control the LED lamps in the first LED lamp group 23*a* to flash in a high-brightness gradient state, control the LED lamps 23*b* in the second LED lamp group 23*a* to flash in a medium-brightness gradient state, control the LED lamps 23*b* in the third LED lamp group 23*a* to flash in a gradient state (i.e., with gradient in the lit lamps), control the LED lamps 23*b* in the fourth LED lamp group 23*a* to flash in a fixed duty cycle output state (lighting lamps have a fixed duty cycle output), control the LED lamps 23*b* in the fifth LED lamp group 23*a* to flash in a fixed duty cycle output state (lighting lamps have a fixed duty cycle output), and control the LED lamps 23*b* in the sixth LED lamp group 23*a* to flash in a fixed duty cycle output state (lighting lamps have fixed duty cycle output), and control the working cycle time of the six LED lamp group 23*a* to be 4.08, with a duty cycle frequency of 200 Hz, this creates a flame like lighting effect by coordinating the LED lamps in different lighting states among the six LED lamp groups.

It should be noted that the mosquito killer 1 also has a flame lamp mode. The lampshade 11 (specifically the side panel 113 described below) is equipped with a flame lamp switch 92, which is electrically connected to the second circuit board 30. Users can operate the flame lamp switch 92 according to their actual needs to put the mosquito killer 1 in flame lamp mode. Of course, when the mosquito killer 1 has multiple different flame lamp modes, users can switch the mosquito killer 1 between different flame lamp modes by operating the flame lamp switch 92 multiple times.

Based on the mosquito killer 1 in the present embodiment, by designing the mosquito trap lamp 22, the mosquito trap lamp 22 can emit light of a preset wavelength to attract mosquitoes, causing them to approach the mosquito trap lamp 22 and come into contact with the electric grid 70, and be killed by the current flowing through the electric grid 70; by designing the flame lamp 23, the flame lamp 23 lights up in a preset way, and the light emitted by the flame lamp 23 can pass through the lampshade 11, simulating the effect of flames to make mosquitoes approach the flame lamp 23 and contact the electric grid 70 of the light emitting assembly 20, and be killed by the current flowing through the electric grid 70 of the light emitting assembly 20; and by designing the mosquito trap lamp 22 and the flame lamp 23, users can choose to turn on the mosquito trap lamp 22 or the flame lamp 23 according to their actual needs to attract mosquitoes. Compared to the mosquito killer 1 that uses a single purple light to attract mosquitoes, the mosquito killing effect of the mosquito killer 1 in this embodiment is better.

Figure 6:
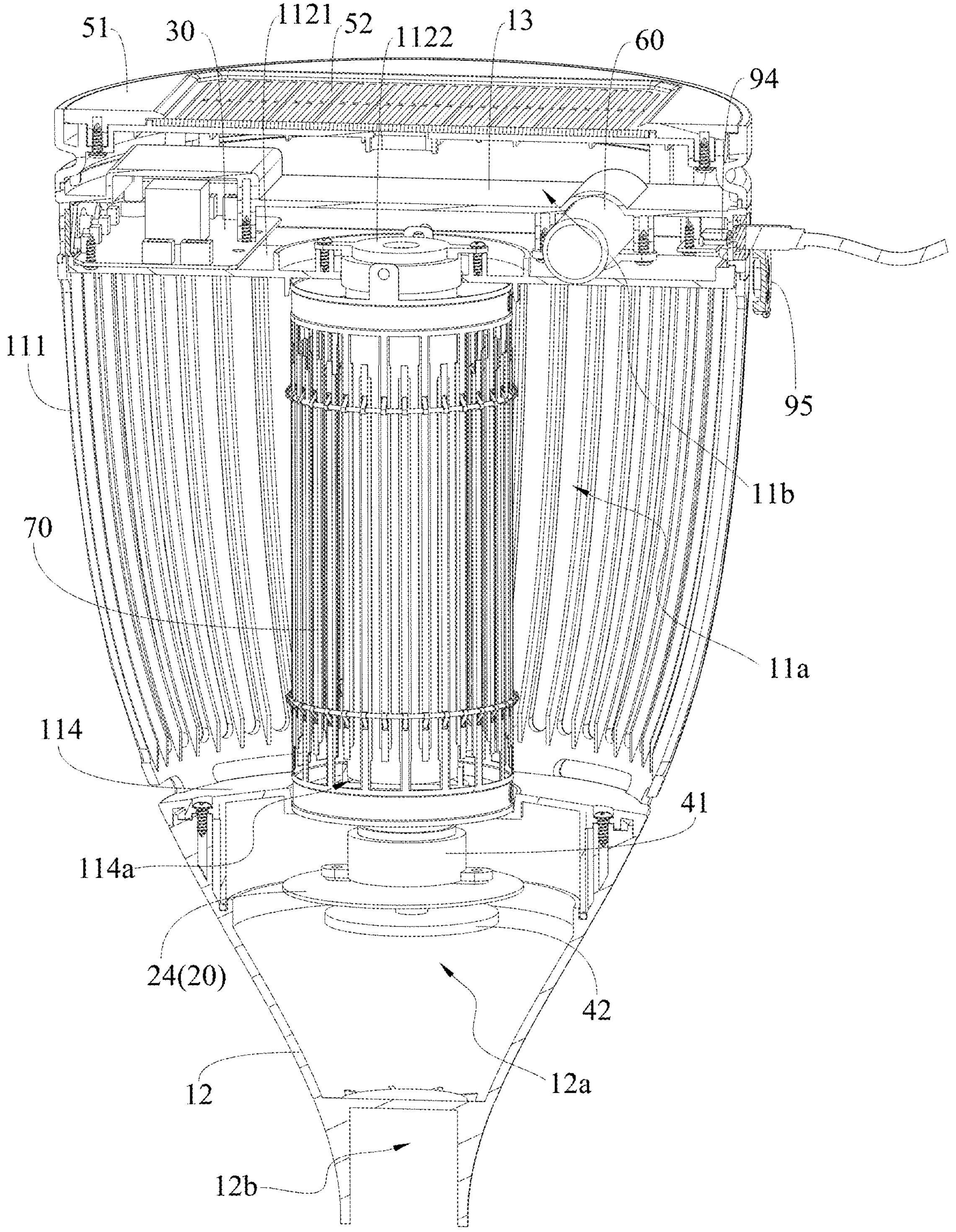
FIG. 6 is a partially cross sectional view of the mosquito killer of FIG. 1.
Figure 9:
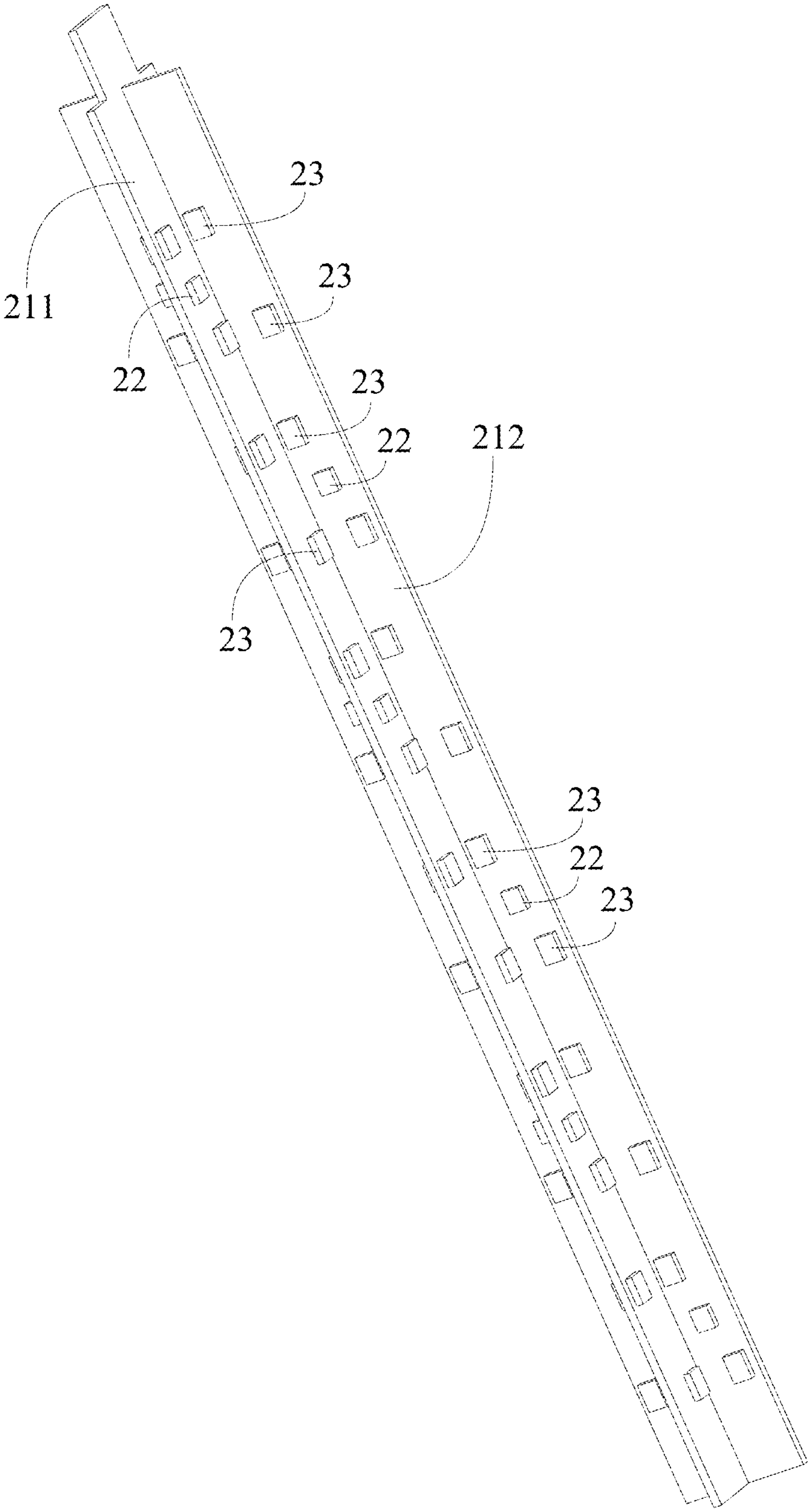
FIG. 9 shows another first circuit board according to a first embodiment of the present disclosure.
Figure 10:
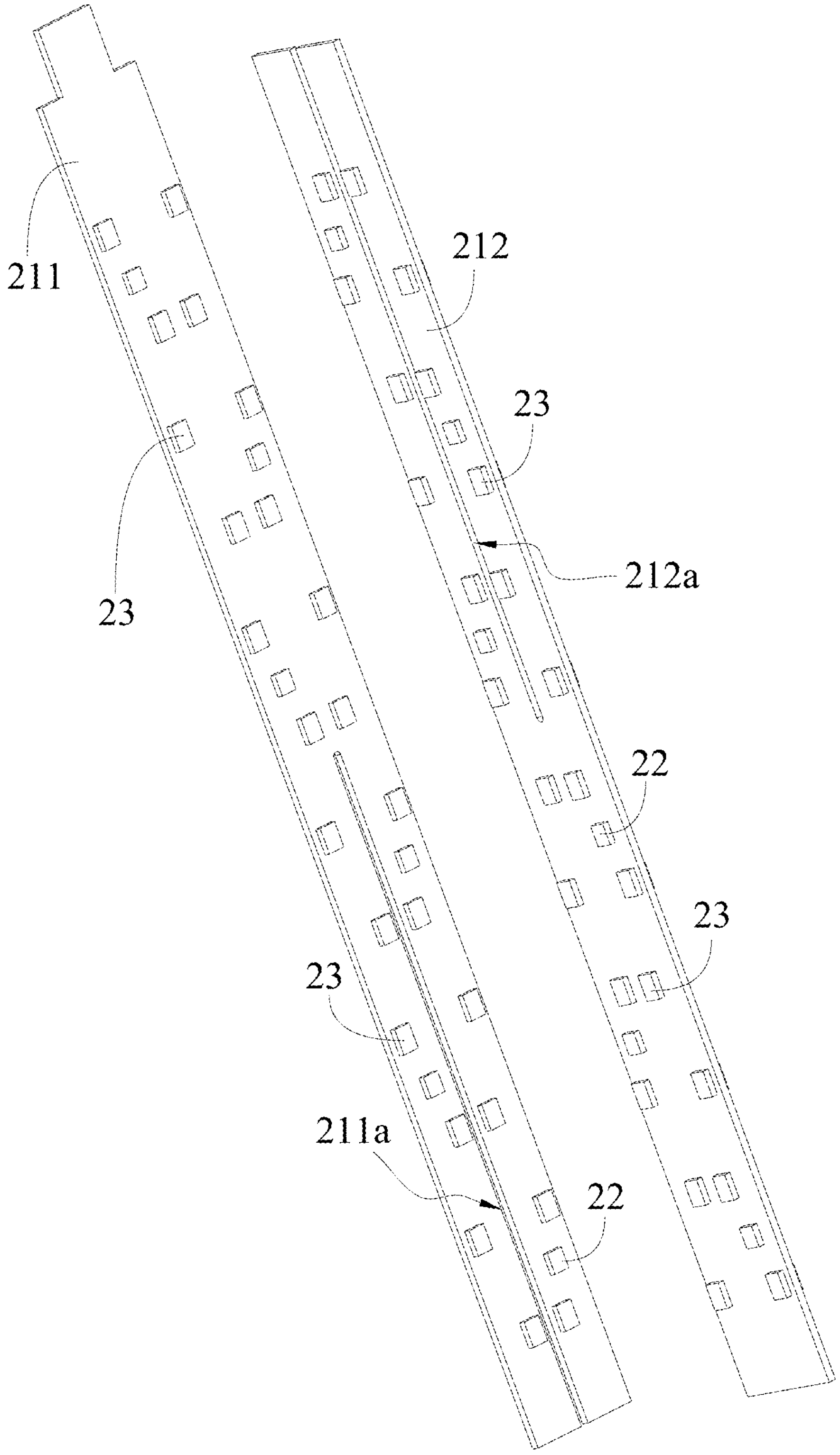
FIG. 10 is an exploded view of the first circuit board of FIG. 9.
Figure 11:
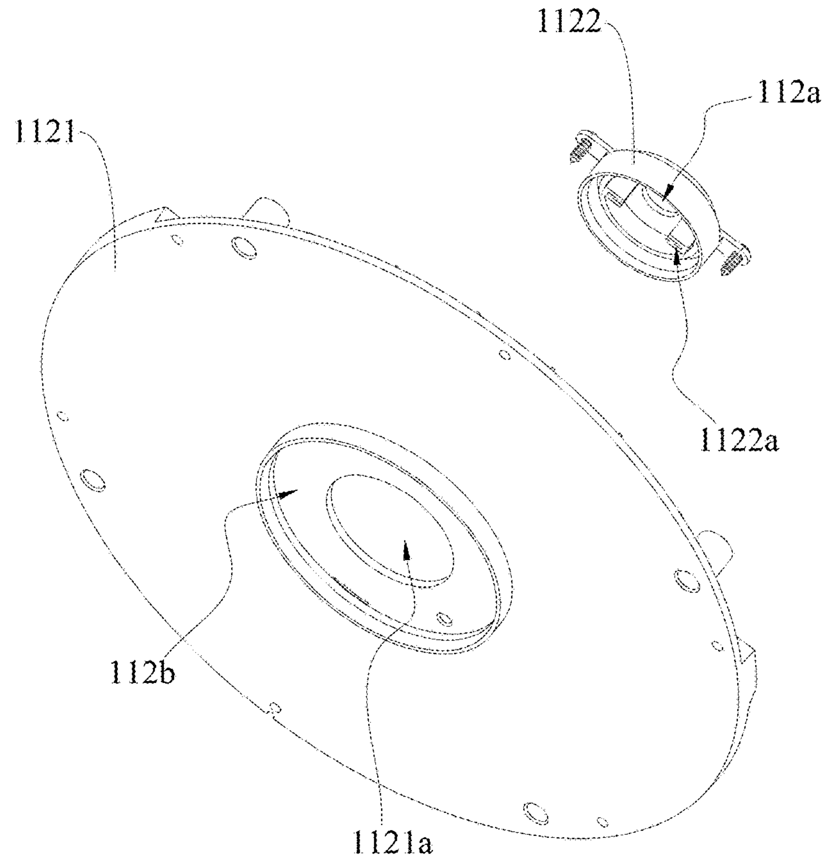
FIG. 11 is an exploded view of the upper base according to a first embodiment of the present disclosure.

As shown in FIGS. 6, 9, and 10, the lampshade 11 is also formed with a second accommodating chamber 11*b*, and the mosquito killer 1 further includes a second circuit board 30, at least a portion of which is located within the second accommodating chamber 11*b* of the lampshade 11. Among them, the second accommodating chamber 11*b* is the remaining hollow area inside the lampshade 11. The second circuit board 30 serves as a driving board, which can be a rigid circuit board, a flexible circuit board, or a combination of a rigid circuit board and a flexible circuit board. It should be noted that when the second circuit board 30 is a flexible circuit board, the mosquito killer 1 may also include another reinforcing plate, which is set on one side of the flexible circuit board to provide support for the flexible circuit board.

The first circuit board 21 includes a first sub circuit board 211 and a second sub circuit board 212 arranged in a cross pattern; the first sub circuit board 211 is electrically connected to the second circuit board 30, and the second sub circuit board 212 is electrically connected to the first sub circuit board 211. A plurality of the mosquito trap lamps 22 and a plurality of the flame lamps 23 are provided, in one example, the mosquito trap lamps 22 or the flame lamps 23 are set on the front and back surfaces of the first sub circuit board 211 and electrically connected to the first sub circuit board 211, and at least the other of the mosquito trap lamps 22 and the flame lamps 23 are set on the front and back surfaces of the second sub circuit board 212 and electrically connected to the second sub circuit board 212. Among them, only the mosquito trap lamps 22 are designed on the front and back of the first sub circuit board 211, while the flame lamps 23 are only designed on the front and back of the second sub circuit board 212; Alternatively, only the flame lamps 23 are designed on the front and back of the first sub circuit board 211, while the mosquito trap lamps 22 are only designed on the front and back of the second sub circuit board 212. In other embodiments, at least one mosquito trap lamp 22 and at least one flame lamp 23 are designed on the first sub circuit board 211, while at least one mosquito trap lamp 22 and at least one flame lamp 23 are also designed on the second sub circuit board 212.

By designing a first sub circuit board 211 and a second sub circuit board 212 that are independent of each other, and designing at least one of the mosquito trap lamp 22 and the flame lamp 23 on the first sub circuit board 211, and designing at least the other of the mosquito trap lamp 22 and the flame lamp 23 on the second sub circuit board 212, modular design can be achieved, and only the damaged parts need to be replaced later. By designing the first sub circuit board 211 and the second sub circuit board 212 to be cross arranged, and designing the mosquito trap lamps 22 or the flame lamps 23 on both sides of the first sub circuit board 211, and the other of the mosquito trap lamps 22 and the flame lamps 23 on both sides of the second sub circuit board 212, 360 degrees all-round illumination can be achieved.

Specifically, the first sub circuit board 211 and the second sub circuit board 212 have a long strip shape extending along a length direction of the mosquito killer 1. The first sub circuit board 211 has a first plug interface 211*a* extending along the length direction of the mosquito killer 1, and the second sub circuit board 212 has a second plug interface 212*a* extending along the length direction of the mosquito killer 1. The first plug interface 211*a* and the second plug interface 212*a* are plugged into each other so that the first sub circuit board 211 and the second sub circuit board 212 are arranged to intersect. In particular, the first plug interface 211*a* and the second plug interface 212*a* extend in opposite directions, for example, the first plug interface 211*a* can extend from a middle of the first sub circuit board 211 to a top of the first sub circuit board 211, while the second plug interface 212*a* extends from a middle of the second sub circuit board 212 to a bottom of the second sub circuit board 212; the first plug interface 211*a* can also extend from a middle of the first sub circuit board 211 to a bottom of the first sub circuit board 211, while the second plug interface 212*a* extends from a middle of the second sub circuit board 212 to a top of the second sub circuit board 212. It should be noted that the first sub circuit board 211 is designed with gold fingers at the position of the first plug interface 211*a* and at the position of the second plug interface 212*a*, thereby achieving electrical connection between the first sub circuit board 211 and the second sub circuit board 212.

The first sub circuit board 211 and the second sub circuit board 212 are connected through the first plug interface 211*a* and the second plug interface 212*a* to achieve relative fixation of their positions. The structure is simple and easy to implement.

As shown in FIGS. 2, 3, 6, and 11, the lampshade 11 includes a grille 111, an upper base 112, and a side panel 113. The side panel 113 is arranged around the circumference of the upper base 112 and connected to it to enclose the second accommodating chamber 11*b*, while the grille 111 is arranged around the circumference of the side panel 113 and connected to it to enclose the first accommodating chamber 11*a*. The upper base 112 has an insertion hole 112*a* that connects the first accommodating chamber 11*a* and the second accommodating chamber 11*b*. One end of the first sub circuit board 211, which is close to the upper base 112, is inserted into the insertion hole 112*a*, and at least one of the first sub circuit board 211 and the second sub circuit board 212, is connected to the upper base 112.

Among them, the light emitted by the mosquito trap lamp 22 and the flame lamp 23 can penetrate through the gap between adjacent two bars of the grid 111. The specific connection method between the upper base 112 and the grille 111 is not limited here, and designers can make reasonable designs according to actual needs; for example, the upper base 112 can be, but is not limited to, detachably connected to the grille 111 through at least one of screw connection, card connection, or plug-in connection; for another example, the upper base 112 can also be non-detachably connected to the grille 111 through methods such as adhesive bonding, riveting, injection molding, or 3D printing. The specific connection method between the side panel 113 and the upper base 112 is not limited here, and designers can make reasonable designs according to actual needs; for example, the side panel 113 can be, but is not limited to, detachably connected to the upper base 112 through at least one of screw connection, card connection, or plug-in connection; for another example, the side panel 113 can also be non removable connected to the upper base 112 through methods such as adhesive bonding, riveting, injection molding, or 3D printing, but not limited to.

The grille 111, upper base 112, and side panel 113 are connected to form a first accommodating chamber 11*a* and a second accommodating chamber 11*b*. The first accommodating chamber 11*a* provides sufficient storage space for components such as the first circuit board 21, mosquito trap lamp 22, and flame lamp 23, while the second accommodating chamber 11*b* provides sufficient storage space for components such as the second circuit board 30 and the energy storage battery 60 of the mosquito killer 1; the first accommodating chamber 11*a* and the second accommodating chamber 11*b* are connected through the insertion hole 112*a* designed on the upper base 112, which facilitates the electrical connection between the first circuit board 21 (specifically the first sub circuit board 211 mentioned above) and the second circuit board 30.

Specifically, the upper base 112 includes an upper end panel 1121 and a mounting seat 1122. The grille 111 is arranged around the circumference of the upper end panel 1121 and connected to it. The upper end panel 1121 has a through hole 1121*a*, and the mounting seat 1122 has the above-mentioned insertion hole 112*a* (see FIG. 10). The mounting seat 1122 is inserted into the through hole 1121*a* and can be detachably connected to the upper end panel 1121 by locking screws. The mounting seat 1122 also has a slot 1122*a*. At least one of the first sub circuit board 211 and the second sub circuit board 212 is fixed in position with the mounting seat 1122 by clamping with the slot 1122*a* (see FIG. 11).

Figure 2:
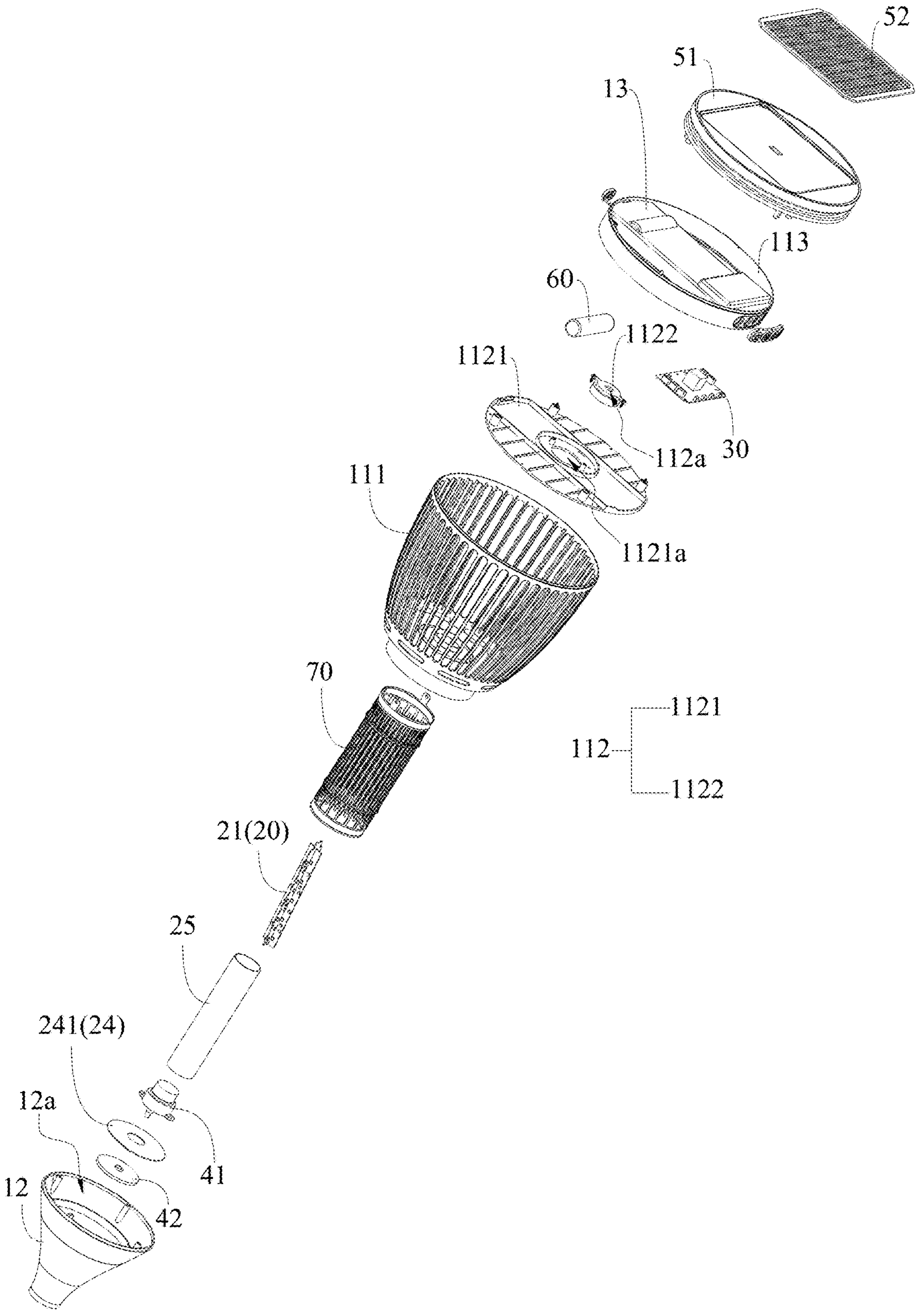
FIG. 2 is an exploded view of the mosquito killer of FIG. 1.
Figure 3:
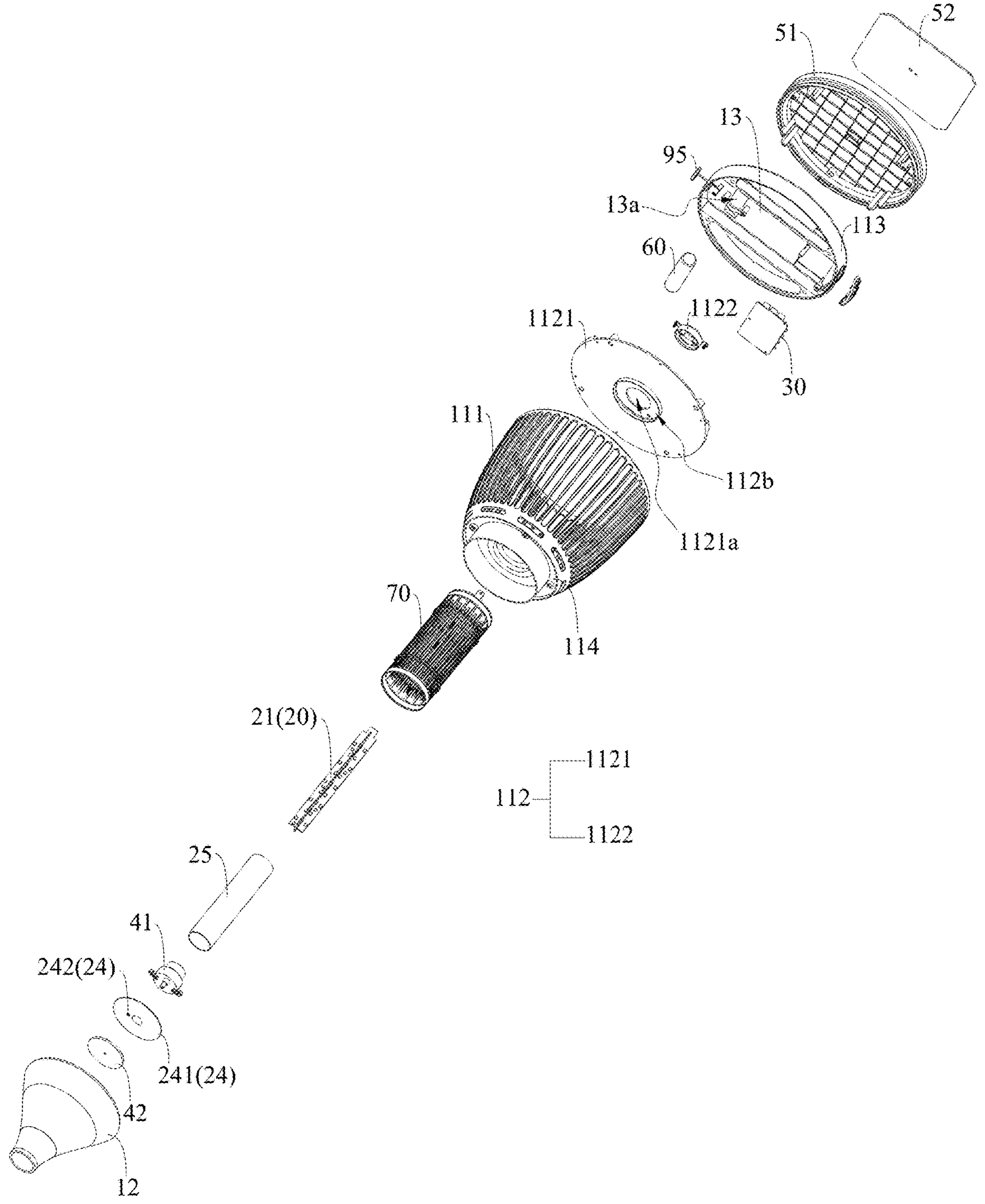
FIG. 3 is another exploded view of the mosquito killer of FIG. 1.
Figure 4:
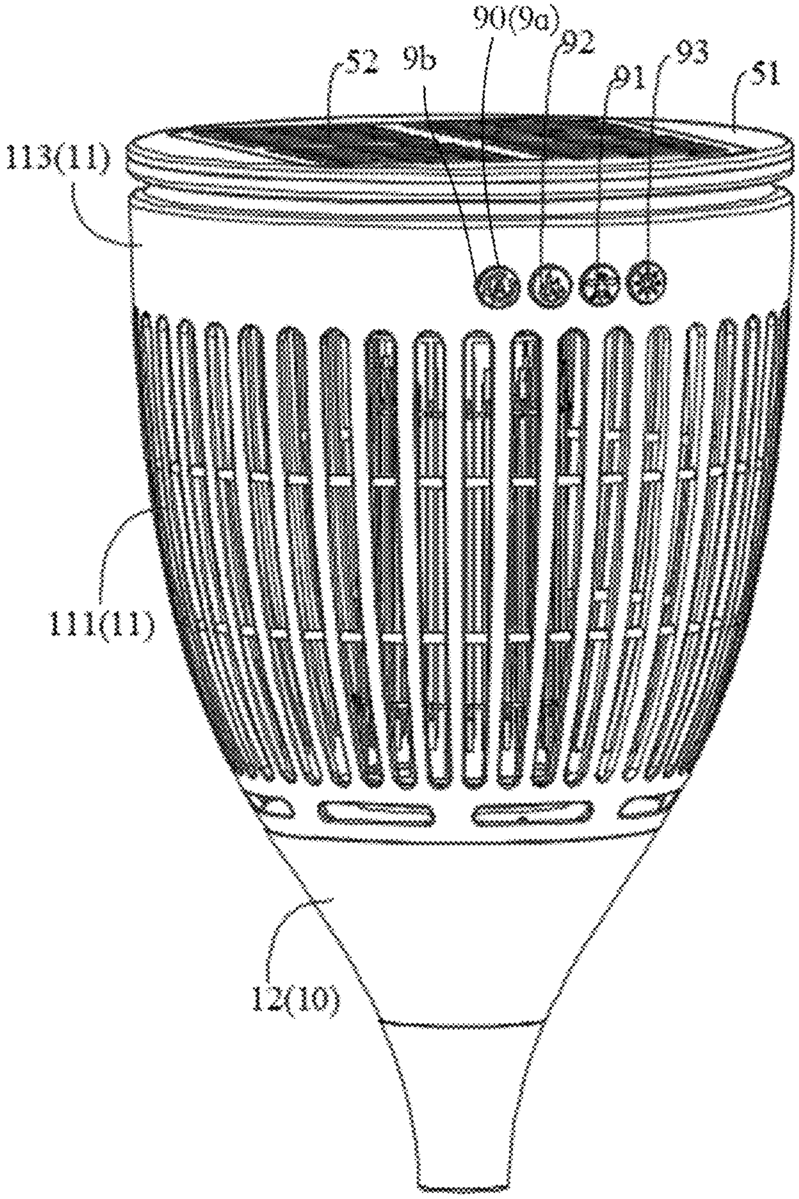
FIG. 4 is a partial view of the mosquito killer of FIG. 1.
Figure 5:
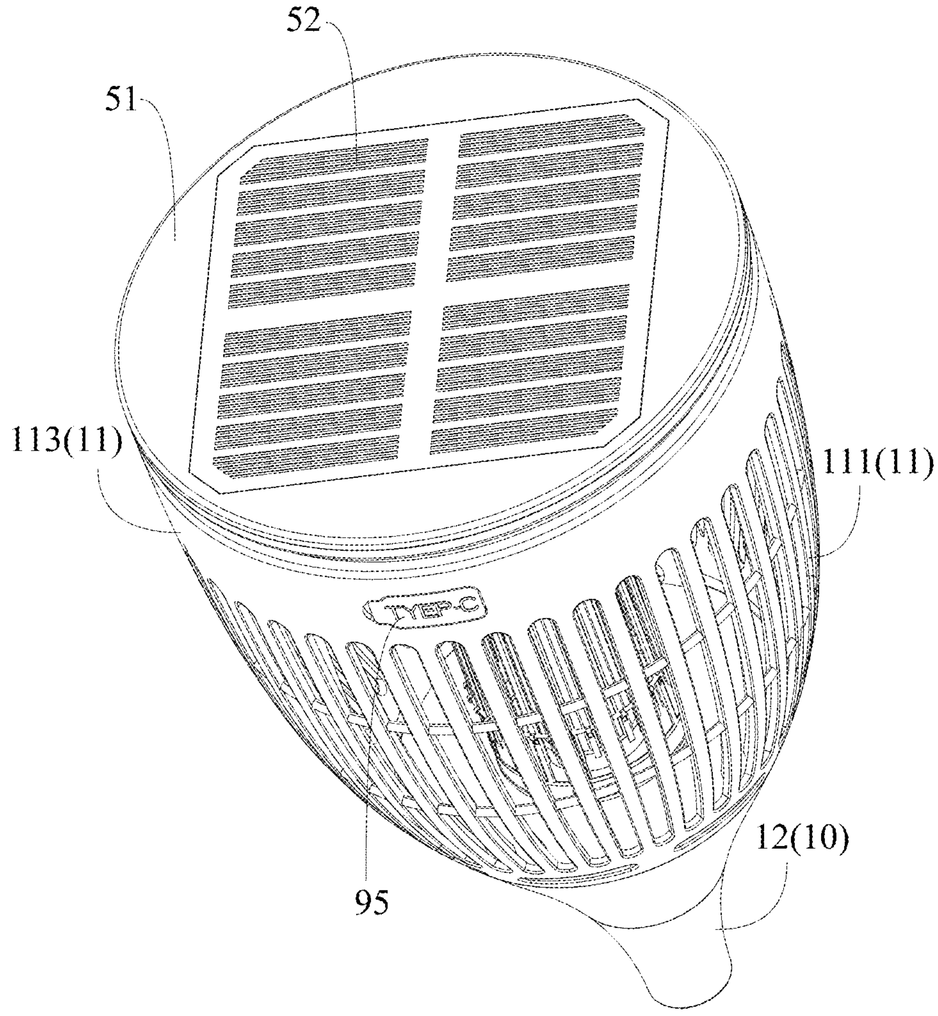
FIG. 5 is another partial view of the mosquito killer of FIG. 1.

As shown in FIGS. 2, 3, and 6, the housing 10 further includes a base 12 with transparency, which has a third accommodating chamber 12*a*. The lampshade 11 also includes a lower base 114, which is connected to one end of the grille 111 away from the upper base 112, and is connected to the base 12 to cover the opening of the third accommodating chamber 12*a*.

Among them, the specific connection method between the lower base 114 and the grille 111 is not limited here, and designers can make reasonable designs according to actual needs; for example, the lower base 114 can be, but is not limited to, detachably connected to the grille 111 through at least one of screw connection, card connection, or plug-in connection; for another example, the lower base 114 can also be non-detachably connected to the grille 111 through methods such as adhesive bonding, riveting, injection molding, or 3D printing, but not limited to.

The base 12 has transparency, and the light emitted by the light emitting unit 24 (as described below) of the light emitting assembly 20 can pass through the base 12 to present a brilliant lighting effect. The specific connection method between the lower base 114 and the base 12 is not limited here, and designers can make reasonable designs according to actual needs; for example, the lower base 114 can be, but is not limited to, detachably connected to the base 12 through at least one of screw connection, card connection, or plug-in connection; for another example, the lower base 114 can also, but is not limited to, be non removable connected to the base 12 through adhesive or riveting.

The mosquito killer 1 also includes a motor 41 and an optical element 42 located in the third accommodating chamber 12*a* of the base 12, and the rotating shaft of the motor 41 is connected to the optical element 42. The light emitting assembly 20 also includes a light emitting unit 24, which is located in the third accommodating chamber 12*a* of the base 12, and is configured to project light to the optical element 42; and the optical element 42 has ripples and/or preset patterns. The motor 41 is configured to drive the optical element 42 to move, so that the light emitted by the light emitting unit 24 presents a dynamic effect after being acted upon by the optical element 42 and the base 12. It can be understood that when the base 12 is detachable (such as the base 12 can be detachably connected to the lampshade 11), different projection effects can be achieved by replacing the base 12.

Among them, the motor 41 can be installed on the lower base 114 or on the base 12. The specific installation method between motor 41 and lower base 114 (or base 12) is not limited here, and designers can make reasonable designs according to actual needs; for example, motor 41 can be, but is not limited to, detachably connected to lower base 114 (or base 12) through at least one of screw connection, card connection, or plug-in connection; for another example, motor 41 can also be non-detachably connected to lower base 114 (or base 12) through adhesive bonding or riveting, but not limited to. The motor 41 is electrically connected to the third circuit board 241 (as described below), and the third circuit board 241 is electrically connected to the first circuit board 21. The second circuit board 30 serves as the main control board, and the controller is integrated on the second circuit board 30. The control signal sent by the controller to start and stop the motor 41 is sent to the third circuit board 241 through the first circuit board 21, and then transmitted to the motor 41 through the third circuit board 241.

The optical element 42 is used to change the propagation path of the light projected by the light emitting unit 24. The optical element 42 can include, but is not limited to, relief/embossed glass, microprism array; for example, when the optical element 42 includes embossed/pressed glass, the glass surface has pressed irregular or regular concave convex textures, and the light projected by the light emitting unit 24 will refract and reflect on these concave convex textures, thereby changing the direction of light propagation.

The specific connection method between the optical element 42 and the rotating shaft of the motor 41 is not limited here, and designers can make reasonable designs according to actual needs; for example, the optical element 42 can be, but is not limited to, detachably connected to the rotating shaft of the motor 41 through at least one of screw connection, card connection, or plug-in connection; for another example, the optical element 42 can also be non-detachably connected to the rotating shaft of the motor 41 through adhesive bonding or riveting, but not limited to. It should be noted that the optical element 42 can be directly connected to the shaft of the motor 41; at this time, the rotation of the shaft of the motor 41 drives the optical element 42 connected to it to rotate; and the rotation of the optical element 42 causes the propagation path of the light projected on the optical element 42 to change continuously under the action of the optical element 42, thus presenting a dynamic lighting effect. Of course, the optical element 42 can also be indirectly connected to the shaft of the motor 41; in this situation, the mosquito killer 1 can also include a transmission mechanism (such as a linkage mechanism or a gear transmission mechanism). The optical element 42 is connected to the shaft of the motor 41 through the transmission mechanism; at this time, the rotation of the shaft of the motor 41 drives the transmission mechanism connected to it to move. The movement of the transmission mechanism can drive the optical element 42 connected to it to make linear motion; the linear motion of the optical element 42 causes the propagation path of the light projected on the optical element 42 to continuously change under the action of the optical element 42, thus presenting a dynamic lighting effect.

The light emitting unit 24 includes a third circuit board 241 and an ambient light 242. The third circuit board 241 can be installed on the lower base 114, the base 12, or the motor 41. The third circuit board 241 is electrically connected to the first circuit board 21, and the ambient light 242 is set on the third circuit board 241 and electrically connected to it. The ambient light 242 is used to project light to the optical element 42

Figure 12:
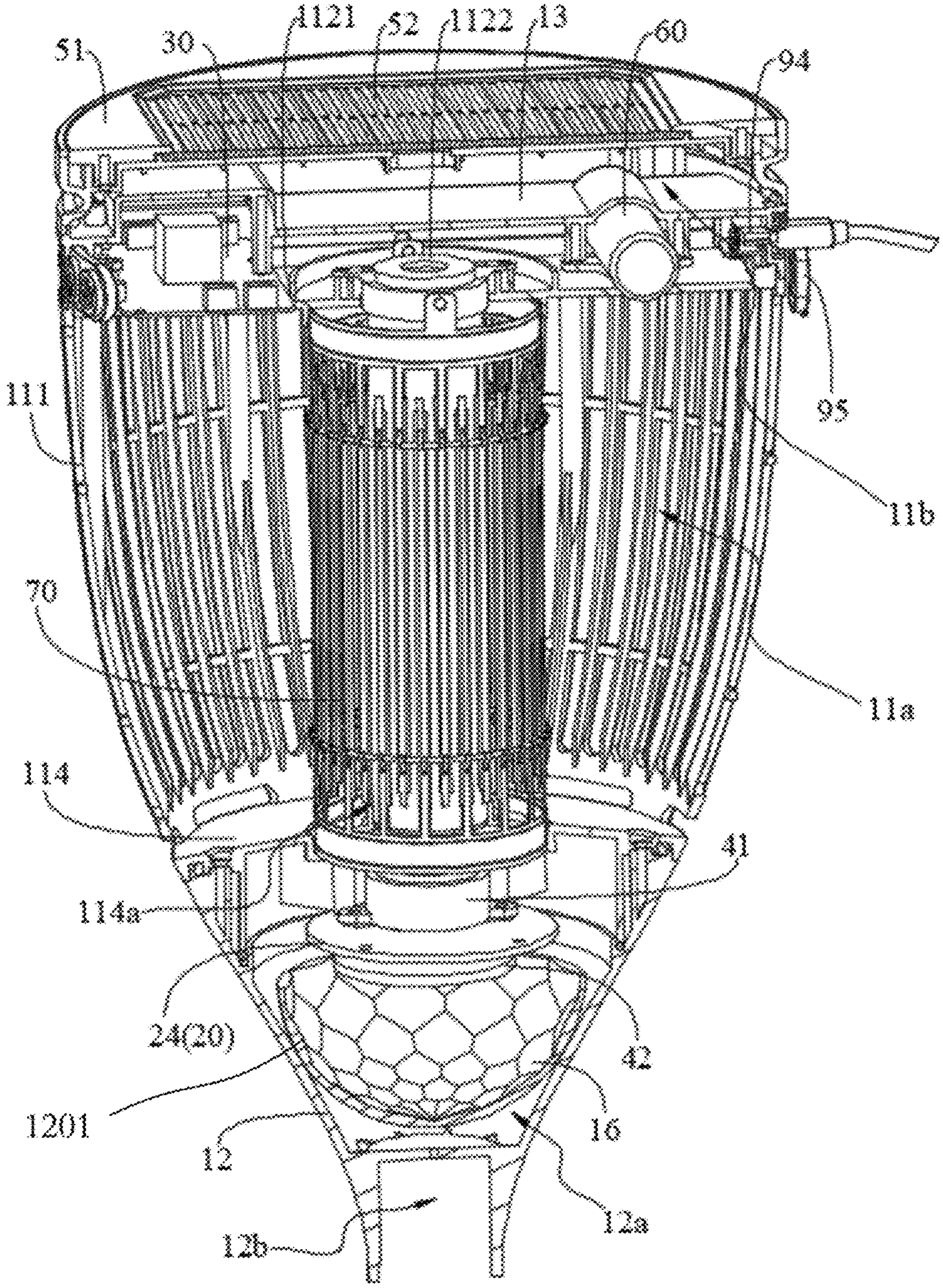
FIG. 12 is partially cross sectional view of the housing with an inner shell according to a first embodiment of the present disclosure.

As shown in FIG. 6, the surface of the transparent base 12 may have patterns; at this time, the ambient light 242 is applied to the transparent base 12 through the optical element 42 and matches the patterns on the surface of the base 12 to present a lighting effect. As shown in FIG. 12, the housing 10 may also include an inner shell 16 with translucency, which is arranged in the third accommodating chamber 12*a* of the base 12. The surface of the inner shell 16 is textured, and the surface of the base 12 is smooth; at this time, the ambient light 242 is applied to the translucent inner shell 16 by the optical element 42, and combined with the textured surface of the inner shell 16, presents a lighting effect.

The inner shell 16 has at least one optical unit 1201, which has an arc-shaped surface and is used to process light from the light emitting unit 24 or the optical element 42 to form projection light; at least one optical unit 1201 has an arc-shaped convex surface, which protrudes towards the side where the light emitting unit 24 is located; at least a portion of the outer diameter of the inner shell 16 gradually decreases along the first direction, which is the direction in which the lampshade 11 faces the base 12 (i.e., from top to bottom in a top-down direction).

By designing the base 12 to have transparency and coordinating the motor 41, optical element 42, and light emitting unit 24, the rotation of the motor 41 drives the optical element 42 to move, so that the light emitted by the light emitting unit 24 presents a dynamic effect after being acted upon by the optical element 42. The dynamic light can pass through the base 12, thereby presenting a brilliant lighting effect on the base 12; by designing the ambient light 242, it can provide a dazzling lighting effect, making the mosquito killer 1 have both good killing function for mosquito and create a good lighting atmosphere, with diverse functions. It should be noted that the mosquito killer 1 also has an ambient light mode. The side panel 113 of the lampshade 11 is also equipped with an ambient light switch 93, which is electrically connected to the second circuit board 30. Users can operate the ambient light switch 93 according to their actual needs to put the mosquito killer 1 in ambient light mode; at this time, the ambient light 242 is lit up, and the light emitted by the ambient light 242 presents a dynamic lighting effect after being acted upon by the optical element 42. Of course, when the mosquito killer 1 has multiple different ambient light modes (such as different colors of light projected by the ambient light 242 in different ambient light modes), users can switch the mosquito killer 1 between different ambient light modes by operating the ambient light switch 93 multiple times.

The mosquito killer 1 also has an automatic induction control mode for mosquito lamps. The lampshade 11 (specifically the side panel 113) is equipped with an automatic induction control switch 90 for mosquito lamps. The automatic induction control switch 90 for mosquito lamps can be electrically connected to the second circuit board 30. Users can operate the automatic induction control switch 90 to put the mosquito killing device 1 in the automatic induction control mode according to their actual needs. When in the automatic induction control mode of the mosquito trap lamp, during the day, the photovoltaic panel 52 of the mosquito killing device 1 is in operation to charge the battery, while the mosquito trap lamp 22 is in the off mode. At night or in low light, when the photovoltaic panel 52 stops charging the battery, the mosquito trap lamp 22 is in the on state to emit mosquito trapping light (such as ultraviolet light).

Furthermore, at least one switch of the mosquito killer 1 (such as the automatic induction control switch 90, mosquito trap switch 91, flame light switch 92, and ambient light switch) may include a flexible silicone cover 9*a*, and the lampshade 11 is provided with an installation hole 9*b*. The flexible silicone cover 9*a* is set in the installation hole 9*b* through interference fit to achieve waterproof effect.

Referring to FIGS. 2, 3, 6 and 11, the specific design of the mosquito trap lamp 22 and flame lamp 23, as well as other structural designs of the light emitting assembly 20, can include:

For example, the mosquito trap lamp 22 includes a UV lamp for emitting ultraviolet light. Ultraviolet light has a strong attraction to mosquitoes, allowing them to approach the mosquito lure lamp 22 as much as possible, thereby coming into contact with the electric grid 70 of the light emitting assembly 20 and being killed by the current flowing through the electric grid 70 of the light emitting assembly 20, making the mosquito killer 1 have a good mosquito killing effect.

For another example, the flame lamp 23 includes LED lamps for emitting monochromatic or colored light. In this way, the flame lamp 23 lights up according to the preset method to present a single color or different color lighting effect.

For further example, the light emitting assembly 20 also includes a diffusion cover 25 connected to the lampshade 11, which has translucency. The diffusion cover 25 is located in the first accommodating chamber 11*a* of the lampshade 11 and is arranged around the first circuit board 21, mosquito trap lamp 22, and flame lamp 23. Specifically, the mounting base 1122 of the upper base 112 also has a first slot 112*b* for inserting one end of the diffusion cover 25, and a second slot 114*a* for inserting the other end of the diffusion cover 25 on the side of the lower base 114 facing the upper base 112. By designing the diffusion cover 25, on the one hand, it can protect the first circuit board 21, mosquito trap lamp 22, and flame lamp 23; and on the other hand, it has a diffusion effect on the light emitted by the mosquito trap lamp 22 and flame lamp 23, scattering the light in all directions, effectively increasing the emission angle and achieving a wider emission range.

The light emitting unit 24 may include LED lights for emitting monochromatic or colored light.

Based on the mosquito killer 1 of this application, a mosquito trap lamp 22 is designed to emit light of a preset wavelength to attract mosquitoes, causing them to approach the mosquito trap lamp 22 and come into contact with the mosquito killer 1, and be killed by the current flowing therethrough. By designing a light emitting unit 24, the light emitting unit 24 is used to emit projection light towards the base to form a projection lamp effect. In particular, visible projection light has higher brightness compared to the ultraviolet light of the mosquito trap lamp 22, which can be irradiated further. Therefore, the projection lamp effect can further attract more and farther mosquitoes to approach the mosquito killer 1 due to the visible projection light, and then be further attracted by the mosquito trap lamp 22 to contact with the electric grid 70 of the mosquito killer 1, and be killed by the current flowing through the electric grid 70 of the mosquito killer 1. By designing mosquito trap lamp 22 and light emitting unit 24 producing the projection lights, users can choose to turn on the mosquito trap lamp 22 or light emitting unit 24 according to their actual needs to attract mosquitoes, as well as improve the effectiveness of obtaining projection lights and mosquito traps. Compared with current mosquito killers those use a single purple light to attract mosquitoes, the mosquito killing effect of the mosquito killer 1 in this application is better.

Furthermore, by designing the flame lamp 23, the lamp efficiency can also be improved, and in some embodiments, the mosquito trap lamp 22 and the flame lamp 23 can be controlled to light up simultaneously. Due to the connection or proximity of the mosquito trap lamp 22 and the flame lamp 23, the visible light of the flame lamp 23 can also be directed to farther places to attract mosquitoes. When mosquitoes approach, they can be further attracted by the light of the mosquito trap lamp 22 and killed by the power grid, thus achieving better mosquito killing and lighting effects.

In addition, in the embodiments of the present application, the light emitting unit 24 is illustrated as being located on the base 12. In some embodiments, such as non solar mosquito killers or solar mosquito killers with photovoltaic panels located in other positions, the light emitting unit 24 can also be set at the top, and projected light can be projected towards the transparent housing above through the light emitting unit 24, and further combined with driving structures such as optical elements 42 and motors 41, as well as optical units on the transparent housing, to form projection light with dynamic imaging (such as starry sky galaxy effect, festival atmosphere effect, preset theme effect, etc.), which can also have good lighting effects for lamps.

In other embodiments, the base 12 can be a shell with transparency, and the shell can be connected to the lampshade 11 at a side thereof.

As shown in FIGS. 2, 3, 5, and 6, the mosquito killer 1 also includes a photovoltaic module 50. The photovoltaic module 50 includes a seat body 51 and a photovoltaic panel 52. The seat body 51 is located at the top of the lampshade 11 and is connected to the lampshade 11 (specifically the side panel 113 introduced earlier). The photovoltaic panel 52 is installed on the side of the seat body 51 facing away from the lampshade 11, and is electrically connected to the second circuit board 30. The mosquito killer 1 also includes an energy storage battery 60, which is located in the second accommodating chamber 11*b* of the lampshade 11 and is electrically connected to the second circuit board 30.

Among them, the seat body 51 serves as the base of the photovoltaic module 50 for carrying the photovoltaic panel 52. The specific connection method between the seat body 51 and the lampshade 11 (specifically the side panel 113 introduced earlier) is not limited here, and designers can make reasonable designs according to actual needs; for example, the seat body 51 can be detachably connected to the lampshade 11 through at least one of screw connection, card connection, or plug-in connection, but not limited to.

The photovoltaic panel 52 is used to convert solar energy into electrical energy. The specific connection method between photovoltaic panel 52 and seat body 51 is not limited here, and designers can make reasonable designs according to actual needs; for example, the photovoltaic panel 52 can be, but is not limited to, detachably connected to the seat body 51 through at least one of screw connection, card connection, or plug-in connection; for another example, the photovoltaic panel 52 can also, but is not limited to, be non-detachably connected to the seat body 51 through adhesive bonding or riveting.

The energy storage battery 60 is used to store the electrical energy converted by the photovoltaic panel 52. The housing assembly 10 also includes a fixing seat 13, which can be integrated with the side panel 113 through injection molding or 3D printing, but is not limited to. The fixing seat 13 has a battery installation slot 13*a*, and the energy storage battery 60 is set in the battery installation slot 13*a*.

By designing photovoltaic panel 52 and energy storage battery 60, photovoltaic panel 52 is used to convert solar energy into electrical energy, and energy storage battery 60 is used to store the electrical energy converted by photovoltaic panel 52, which can provide the necessary electrical energy for components such as mosquito trap 22 and flame lamp 23 to work. Reasonable use of solar energy as a clean energy source can reduce energy pollution.

Figure 13:
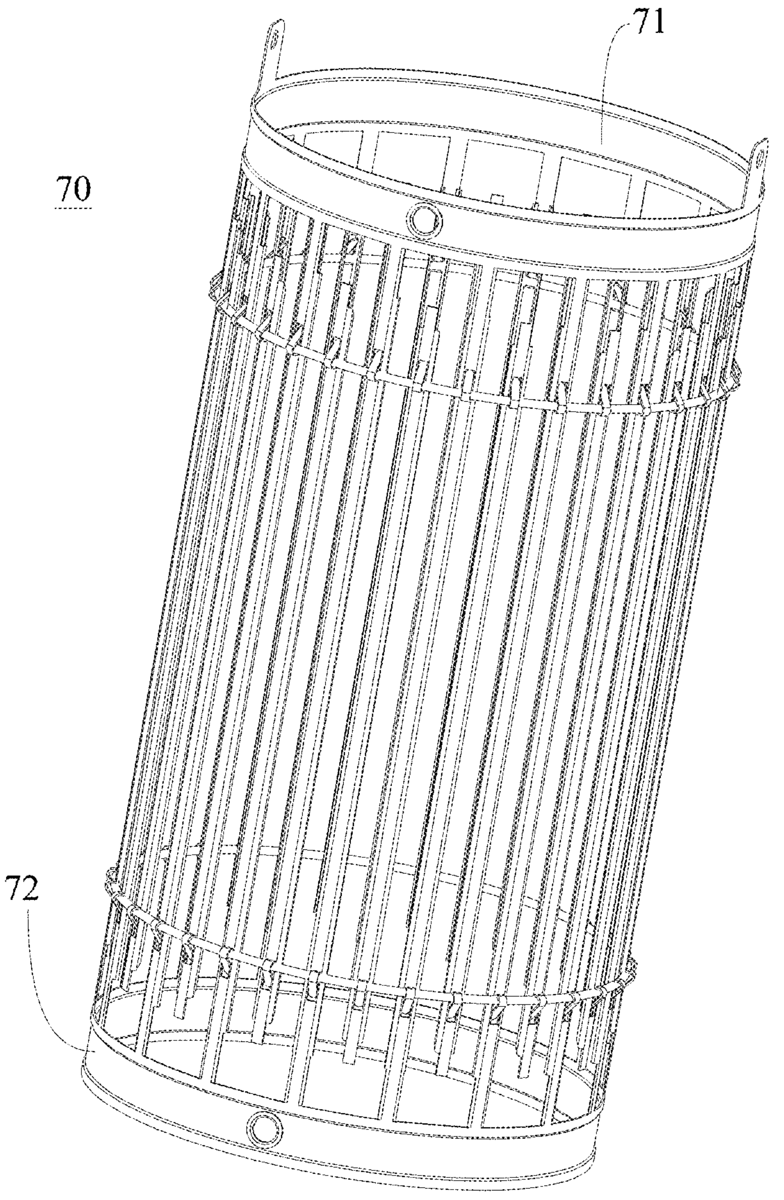
FIG. 13 is a schematic view of the electric grid according to a first embodiment of the present disclosure.
Figure 14:
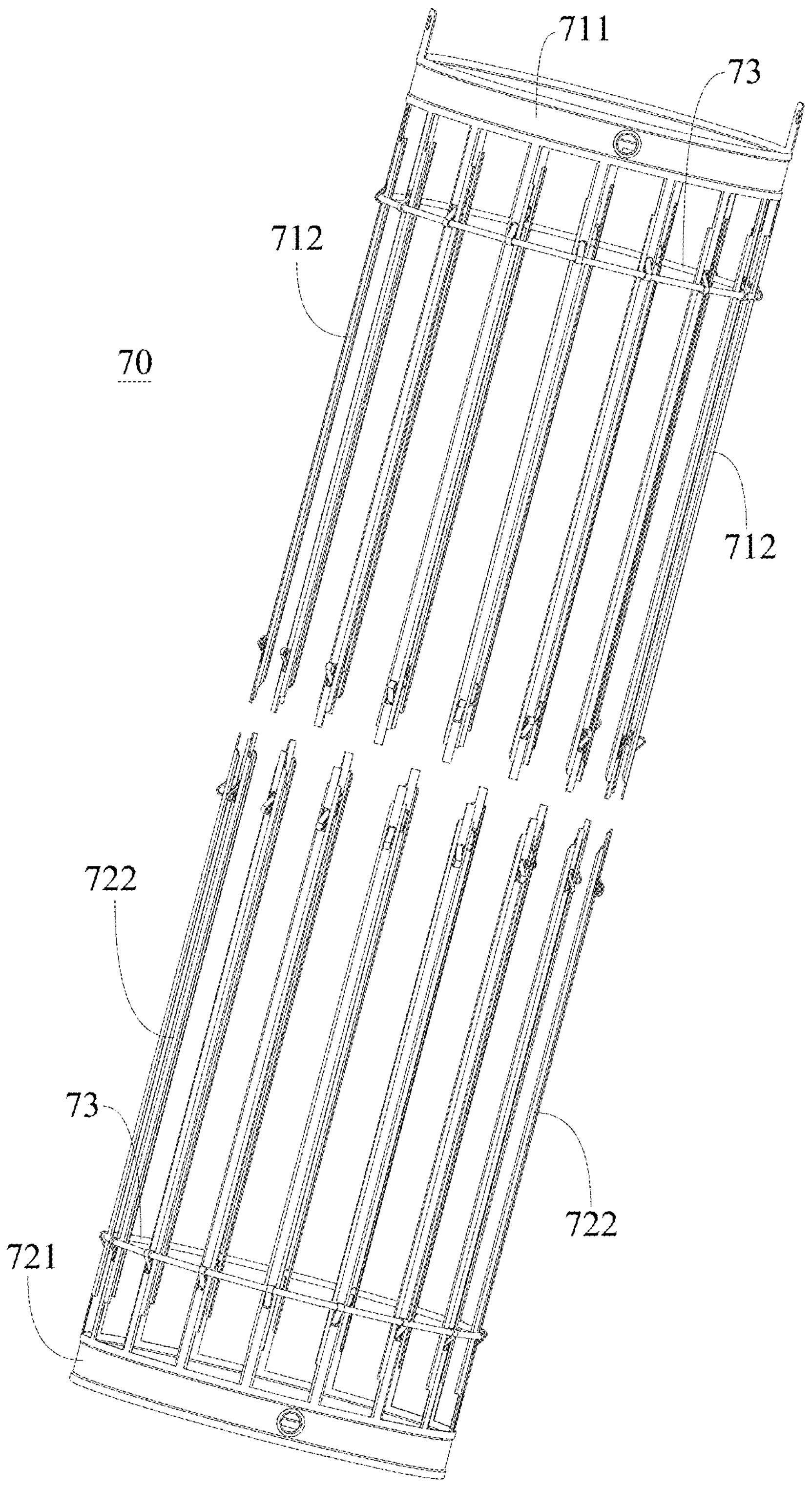
FIG. 14 is an exploded view of the electric grid of FIG. 13.

As shown in FIGS. 6, 13, and 14, the mosquito killer 1 further includes an electric grid 70 located in the first accommodating chamber 11*a* of the lampshade 11 and connected to the lampshade 11. The electric grid 70 includes a positive electrode body 71, a negative electrode body 72, and at least one connecting strip 73; the positive electrode body 71 includes a positive electrode connecting part 711 and multiple positive electrode strip-shaped parts 712 sequentially connected to the positive electrode connecting part 711. The positive electrode connecting part 711 is connected to the lampshade 11 (specifically one of the upper base 112 and the lower base 114 introduced earlier). The negative electrode body 72 includes a negative electrode connecting part 721 and multiple negative electrode strip-shaped parts 722 sequentially connected to the negative electrode connecting part 721. The negative electrode connecting part 721 is connected to the lampshade 11 (specifically the other of the upper base 112 and the lower base 114 introduced earlier); multiple positive electrode strip-shaped parts 712 and multiple negative electrode strip-shaped parts 722 are alternately arranged at intervals and located between the positive electrode connecting part 711 and the negative electrode connection portion 721. At least one connecting strip 73 connects multiple positive bar shaped portions 712 and multiple negative electrode strip-shaped parts 722 as a whole. The setting of this electric grid 70 structure is mainly to kill mosquitoes and insects through the positive and negative pole structures. When mosquitoes and insects land on the electric grid 70, they come into contact with the adjacent positive electrode strip-shaped part 712 and negative electrode strip-shaped part 722 to form a conductive circuit, and current flows through the conductive circuit to electrocute mosquitoes and insects. The connecting strip 73 serves to fix and connect multiple positive electrode strip-shaped parts 712 and multiple negative electrode strip-shaped parts 722 together, while also providing insulation for the positive and negative electrodes.

Among them, the number of at least one connecting strip 73 includes two. One connecting strip 73 is located near the positive electrode connecting part 711, and the other connecting strip 73 is located near the negative electrode connecting part 721. Setting two connecting strips 73 can not only achieve the function of fixed insulation, but also save processes, improve production efficiency, and save materials. It is best to set the two connecting strips 73 parallel to each other to make the appearance neater, the texture higher, and also facilitate the clear division and installation of the structure. At least one connecting strip 73 is made of transparent material, preferably all connecting strips 73 are made of transparent material for clear division and installation of the structure. If multiple positive electrode strip-shaped parts 712 and multiple negative electrode strip-shaped parts 722 are parallel to each other, and at least one connecting strip 73 is perpendicular to multiple positive electrode strip-shaped parts 712 and multiple negative electrode strip-shaped parts 722, then this structure makes the appearance of the mosquito killer 1 more neat, orderly, and clearly structured, improving the customer's user experience.

As shown in FIGS. 1, 6, 15-21, the bottom of the housing 10 (specifically the base 12 introduced earlier) is provided with an installation hole 12*b*. The mosquito killer 1 also includes a support component 80, one end of which is used to connect with the installation hole 12*b*, and the other end of which is used to connect with an external carrier.

Among them, external carriers can include but are not limited to soil or cement floors in outdoor environments. The support component 80 can be detachably connected to the housing 10 or non-detachably connected to the housing 10 through the installation hole 12*b*; and it can be understood that when the support component 80 is detachably connected to the housing 10, if the mosquito killer 1 is used in an indoor environment, the user can remove the support component 80 from the housing 10 according to actual needs to reduce the overall space occupation of the mosquito killer 1. If the mosquito killer 1 is used in an outdoor environment, the user can assemble the support component 80 on the housing 10 through the above-mentioned installation hole 12*b* according to actual needs, so that the support component 80 can effectively support the housing 10, thereby facilitating the fixation of the mosquito killer 1 in the outdoor environment.

Specifically, the support component 80 includes a support column 81 and a grounding structure 82. The top end of the support column 81 is used to connect with the installation hole 12*b*, and the bottom end of the support column 81 is connected to the grounding structure 82. Among them, the installation hole 12*b* can be a threaded hole, and at this time, the top of the support column 81 is provided with an external thread that is connected to the threaded hole to achieve installation between the support column 81 and the housing component 10; the installation hole 12*b* can also be a clamping hole, at this time, the top of the support column 81 is engaged with the wall surface of the card hole through interference fit to achieve the installation between the support column 81 and the housing 10. The specific connection method between the grounding structure 82 and the support column 81 is not limited here, and designers can make reasonable designs according to actual needs; For example, the grounding structure 82 can be, but is not limited to, detachably connected to the support column 81 through at least one of screw connection, clamping connection, or plug-in connection; for example, the grounding structure 82 can also be, but is not limited to, non-detachable connected to the support part through adhesive bonding or riveting.

More specifically, as shown in FIG. 1, the grounding structure 82 includes multiple grounding strips 822 that are connected in a loop and have an inverted hook structure. By designing the grounding structure 82 to include a grounding strip 822 with an inverted hook structure as shown in FIG. 1, it is easy to insert the grounding structure 82 into the soil or cement ground in the outdoor environment, so that the support component 80 can effectively support the housing 10, thereby facilitating the fixation of the mosquito killer 1 in the outdoor environment. As shown in (a) of FIG. 14, the number of grounding strips 822 can be three, and the angle between any two adjacent grounding strips 822 is 120 degrees; As shown in (b) of FIG. 14, the number of grounding strips 822 can also be four, and the angle between any two adjacent grounding strips 822 is 90 degrees; as shown in (c) of FIG. 14, the number of grounding strips 822 can also be five, and the angle between any two adjacent grounding strips 822 is 72 degrees. It should be noted that the number of grounding strips 822 can also be seven or more, and it can be understood that the more grounding strips 822 there are, the stronger the grip of the grounding structure 82.

Figure 15:
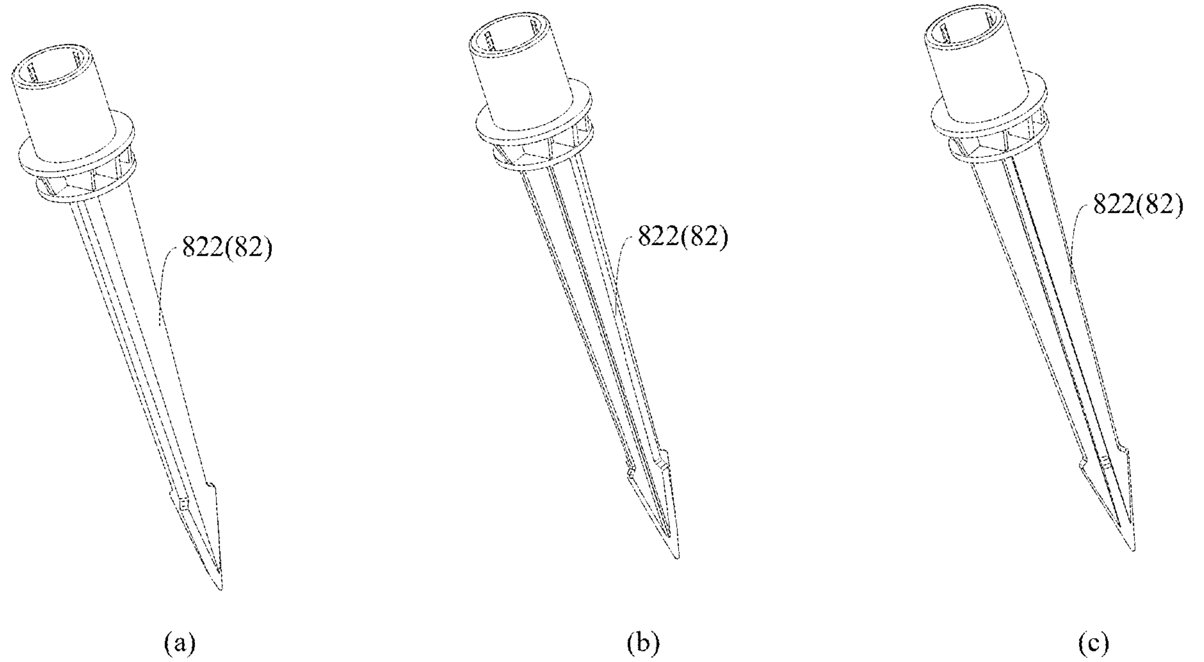
FIG. 15 shows a grounding structure of the mosquito killer according to a first embodiment of the present disclosure.
Figure 16:
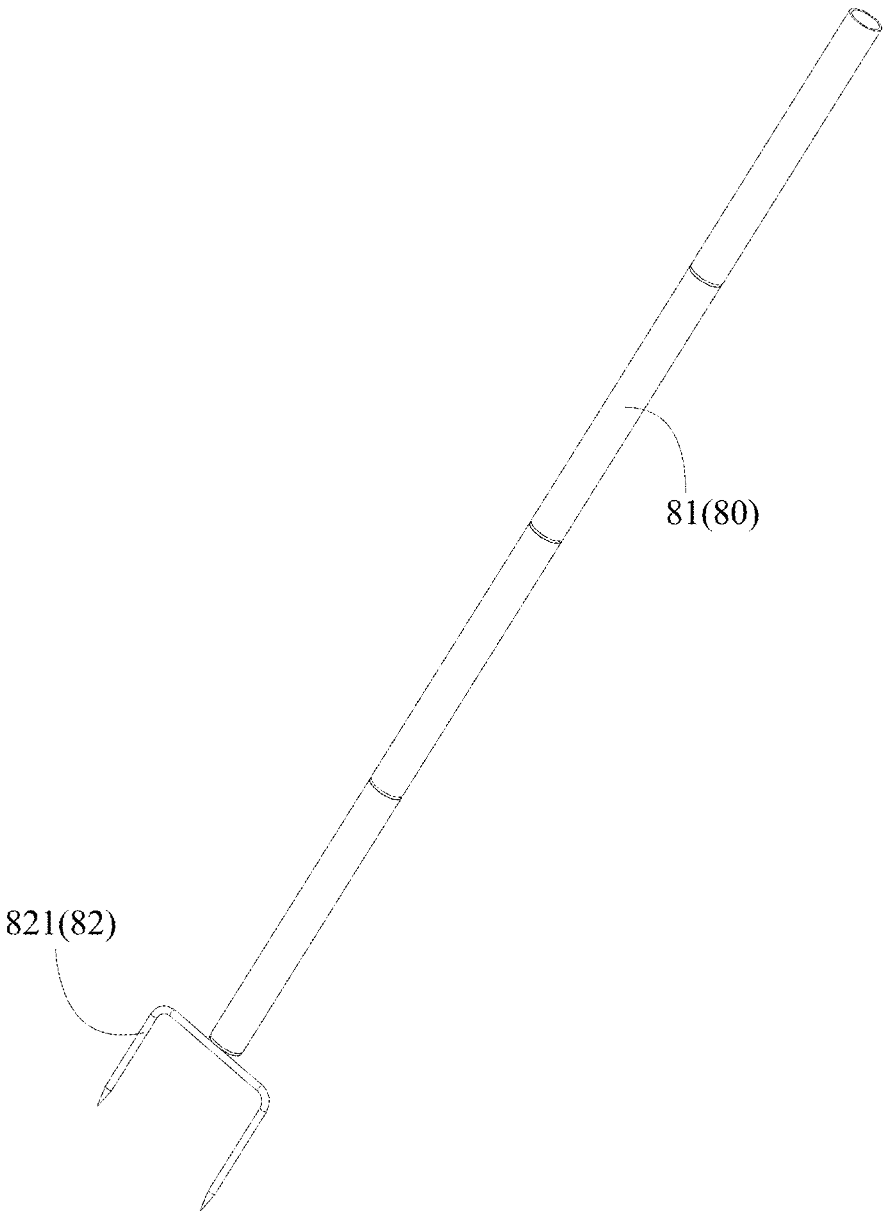
FIG. 16 shows another grounding structure of the mosquito killer according to a first embodiment of the present disclosure.

As shown in FIG. 16, the grounding structure 82 includes a U-shaped structure 821. By designing the grounding structure 82 to include a U-shaped structure 821 as shown in FIG. 15, it is easy to insert the grounding structure into the soil or cement ground in the outdoor environment, so that the support component 80 can effectively support the housing 10, thereby facilitating the fixation of the mosquito killer 1 in the outdoor environment.

Figure 17:
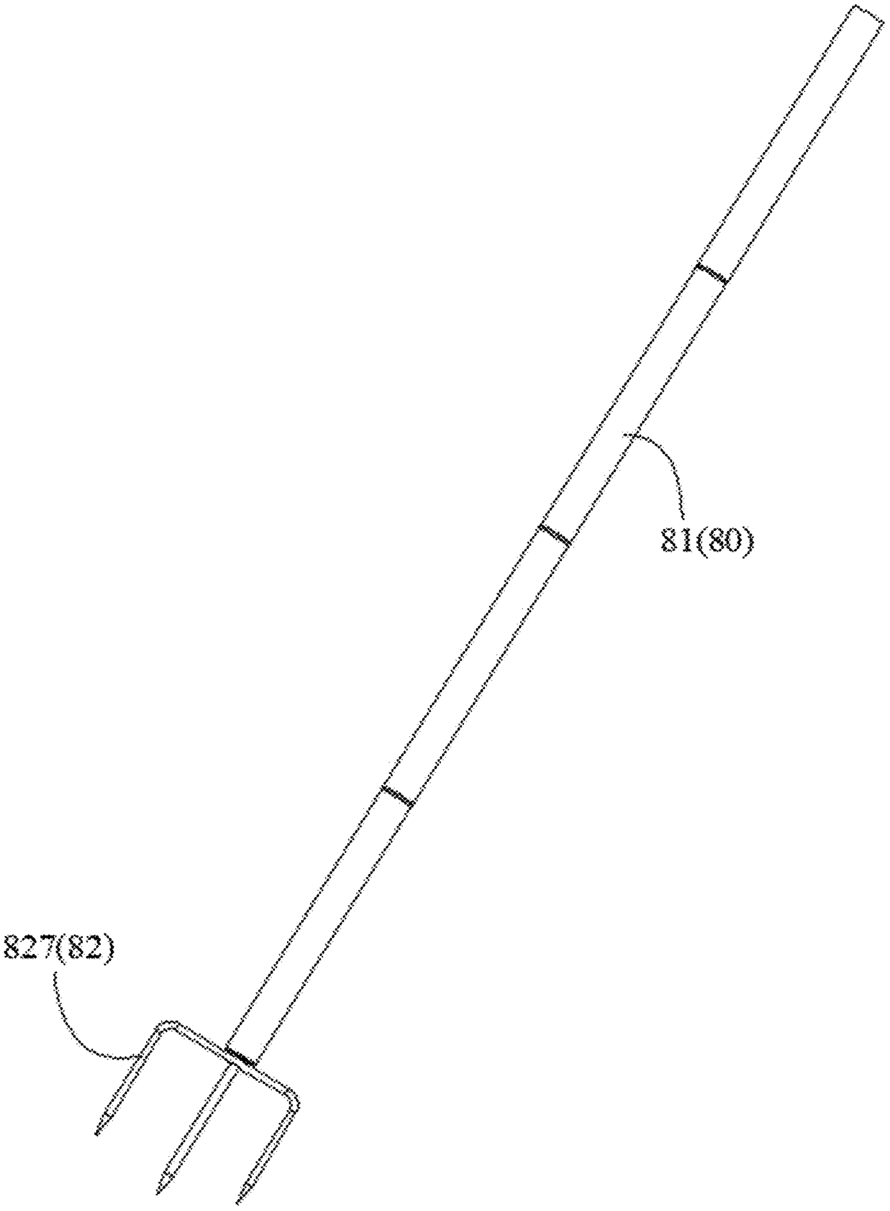
FIG. 17 shows further another grounding structure of the mosquito killer according to a first embodiment of the present disclosure.

As shown in FIG. 17, the grounding structure 82 includes an M-shaped structure 827. By designing the grounding structure 82 to include an M-shaped structure 827 as shown in FIG. 16, it is easy to insert the grounding structure into the soil or cement ground in the outdoor environment, so that the support component 80 can effectively support the housing 10, thereby facilitating the fixation of the mosquito killer 1 in the outdoor environment.

Figure 18:
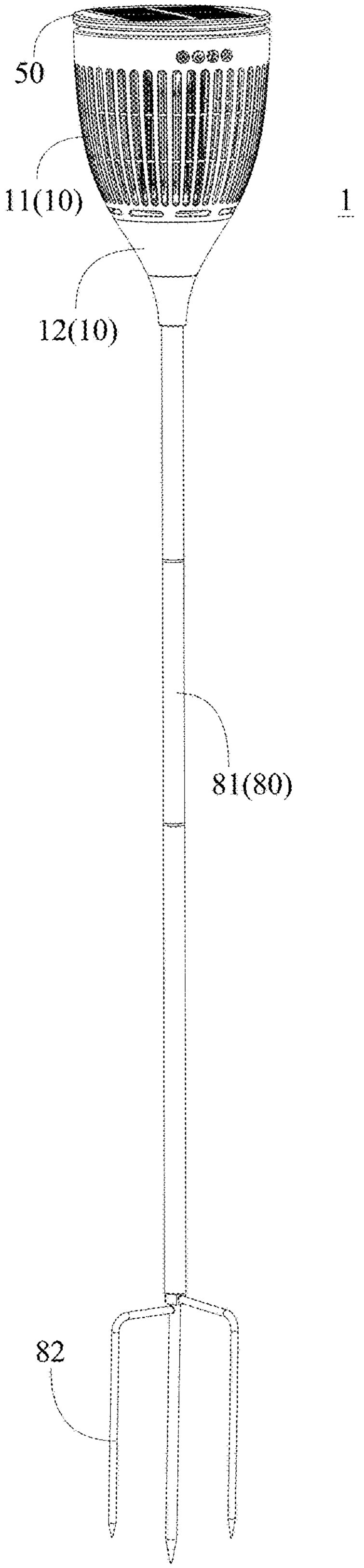
FIG. 18 shows another grounding structure according to a first embodiment of the present disclosure, which includes a first grounding component and second grounding component.
Figure 19:
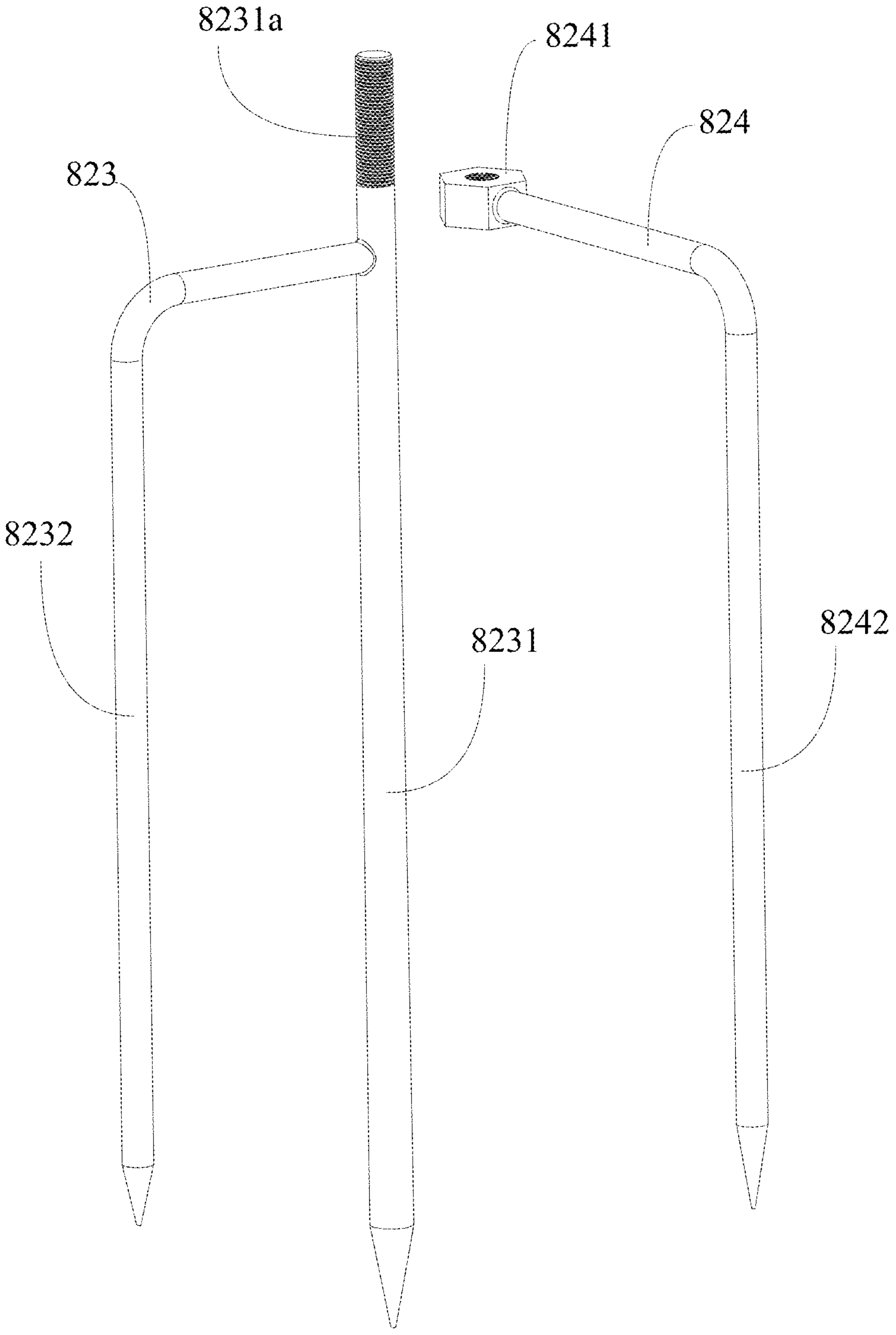
FIG. 19 is an exploded view of the grounding structure of FIG. 18.
Figure 20:
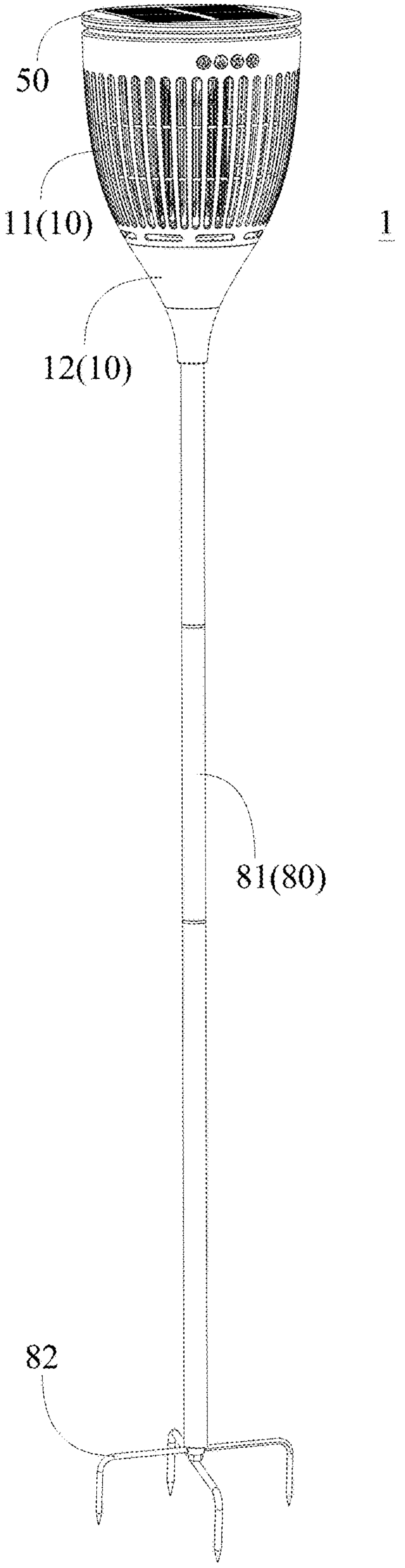
FIG. 20 shows further another grounding structure according to a first embodiment of the present disclosure, which includes a third grounding component and fourth grounding component.
Figure 21:
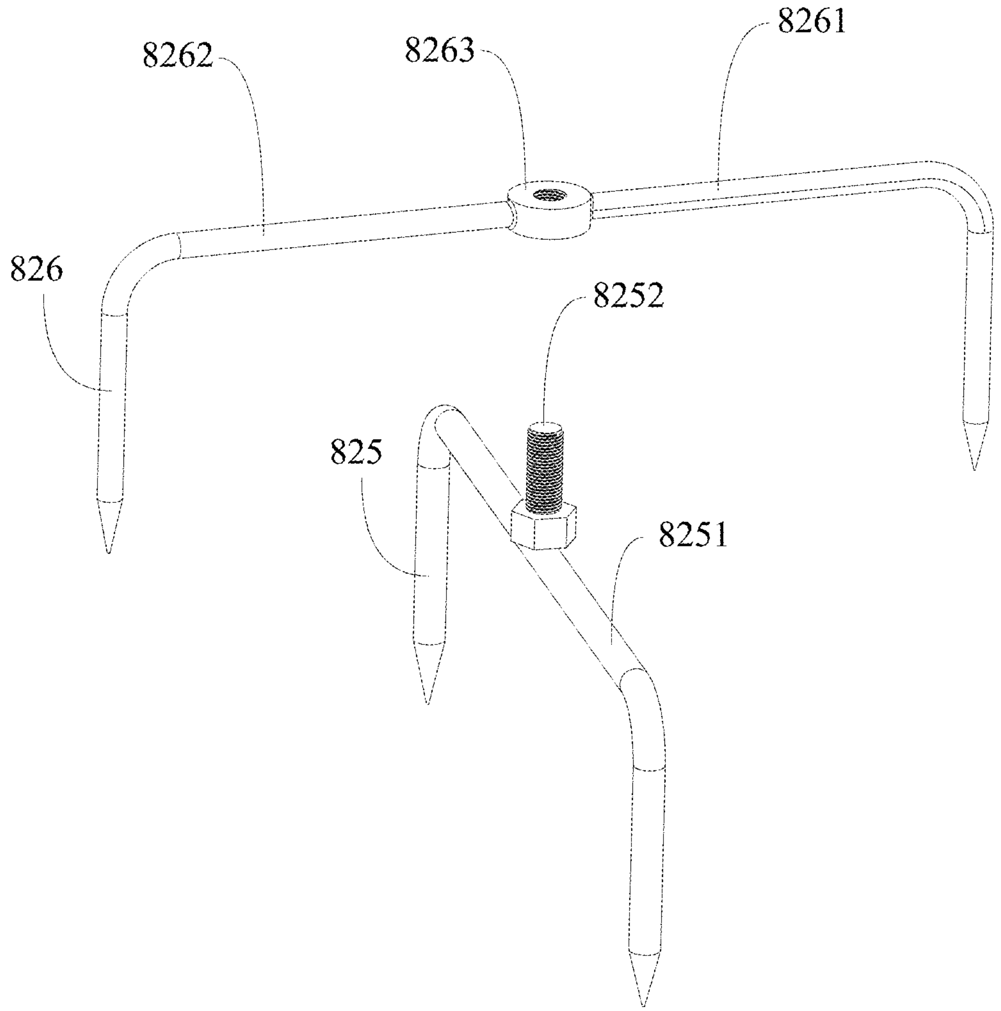
FIG. 21 is an exploded view of the grounding structure of FIG. 20.
Figure 22:
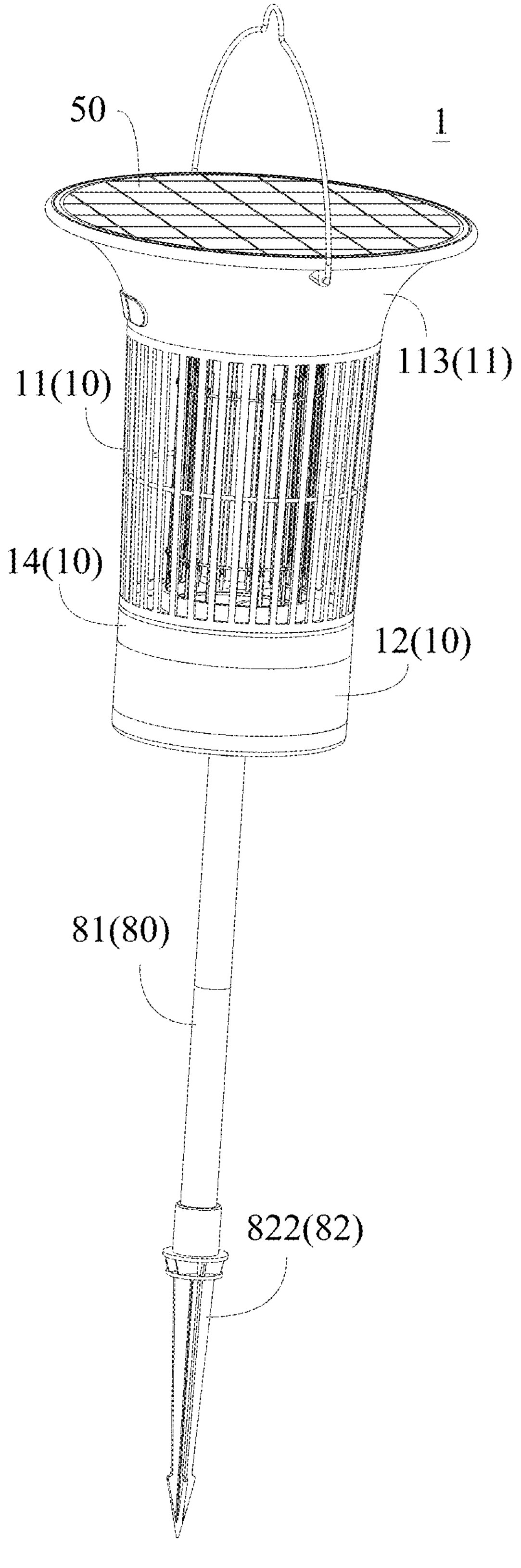
FIG. 22 is a schematic view of a mosquito killer according to a second embodiment of the present disclosure.
Figure 23:
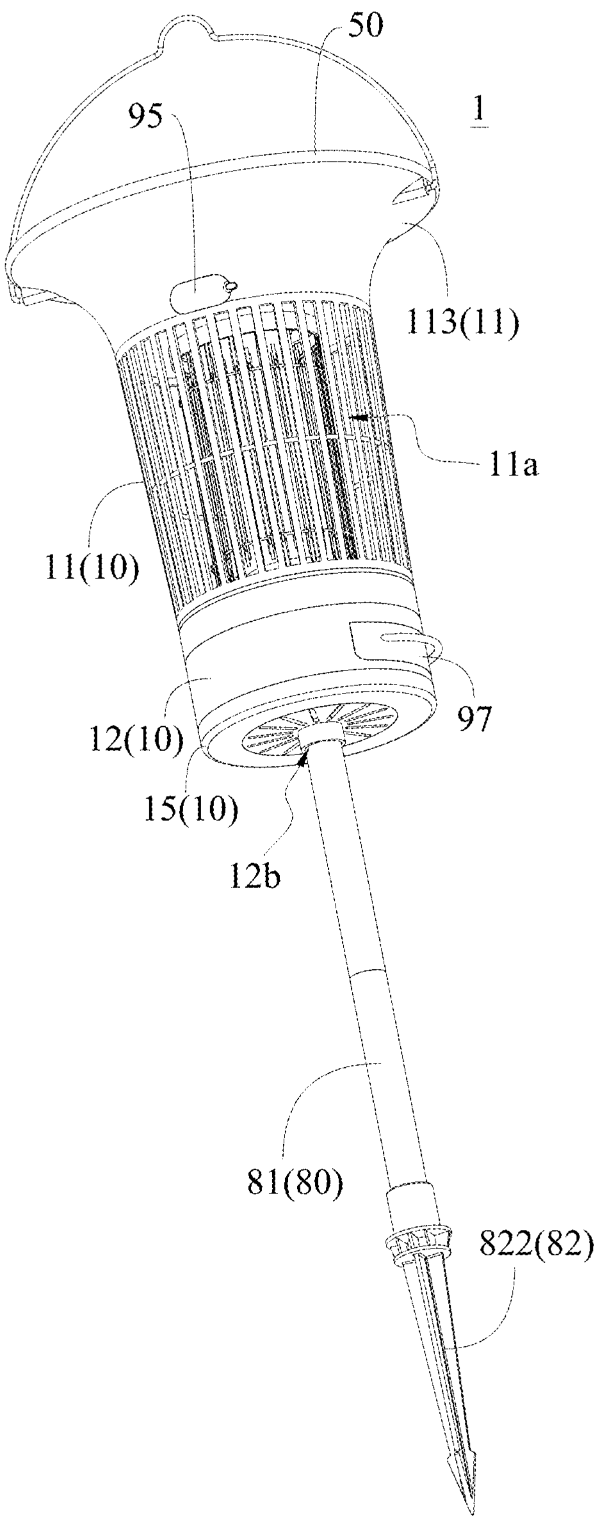
FIG. 23 is another schematic view of the mosquito killer according to a second embodiment of the present disclosure.
Figure 24:
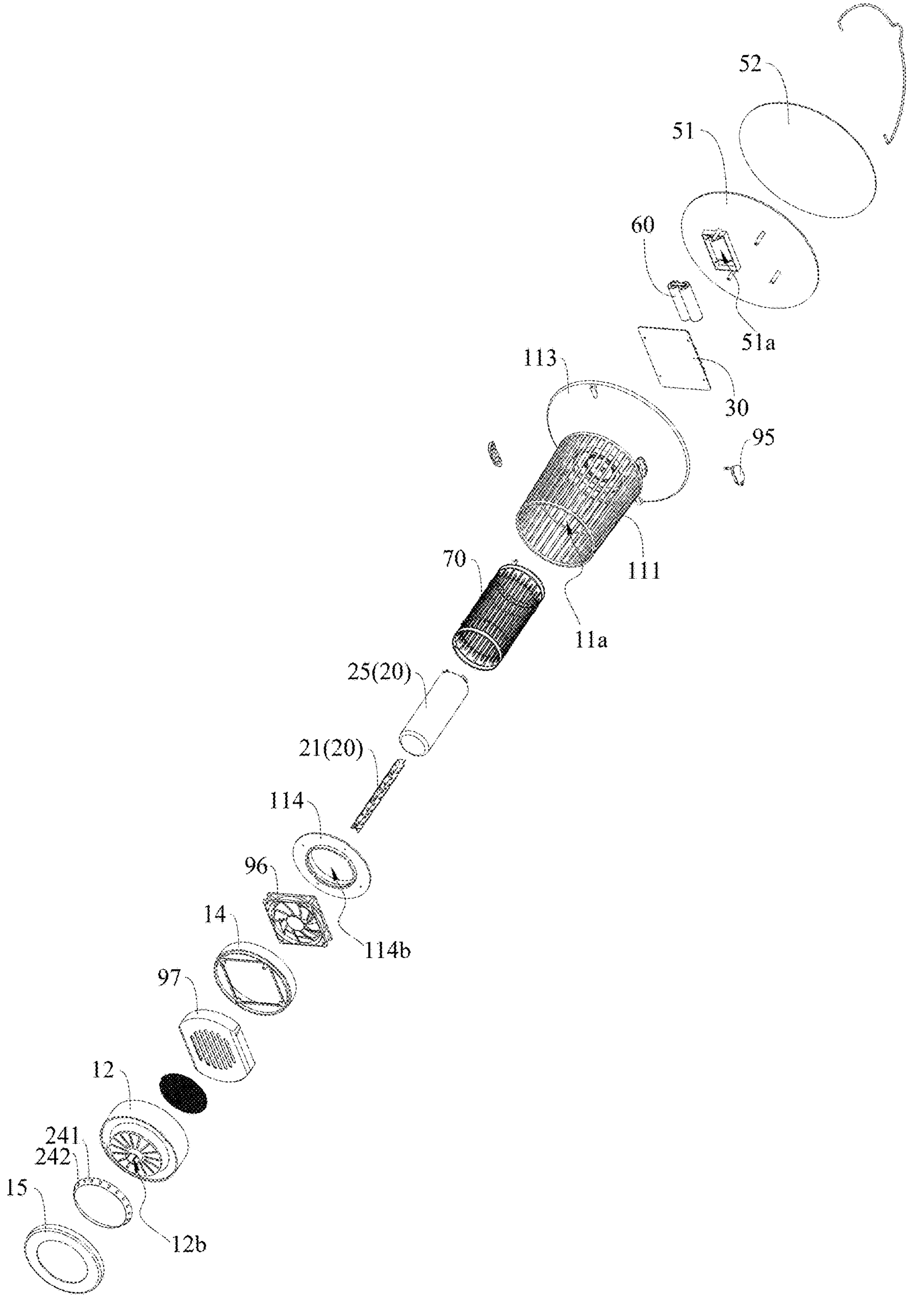
FIG. 24 is a partially exploded view of the mosquito killer of FIG. 22.
Figure 25:
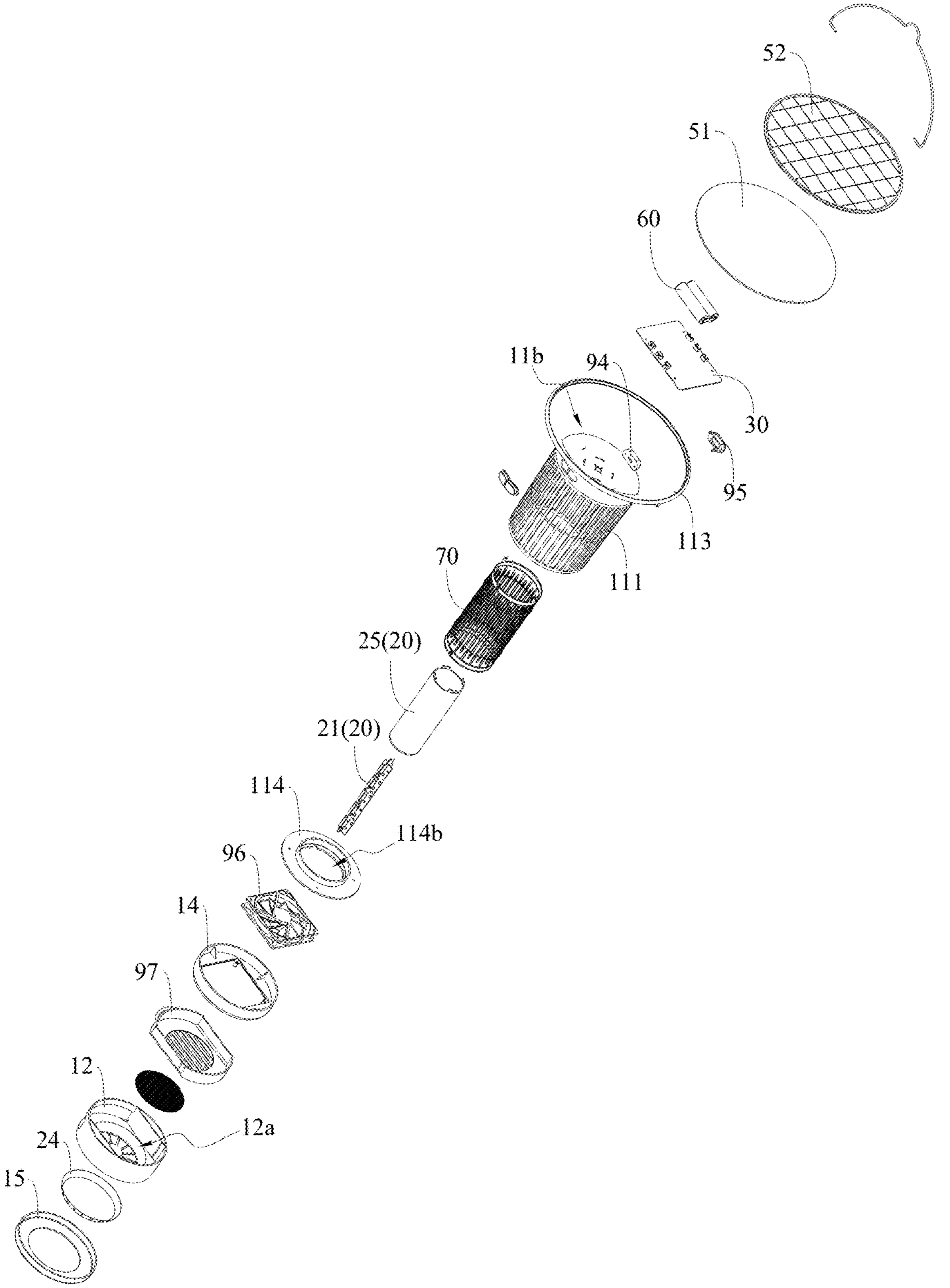
FIG. 25 is another partially exploded view of the mosquito killer of FIG. 22.
Figure 26:
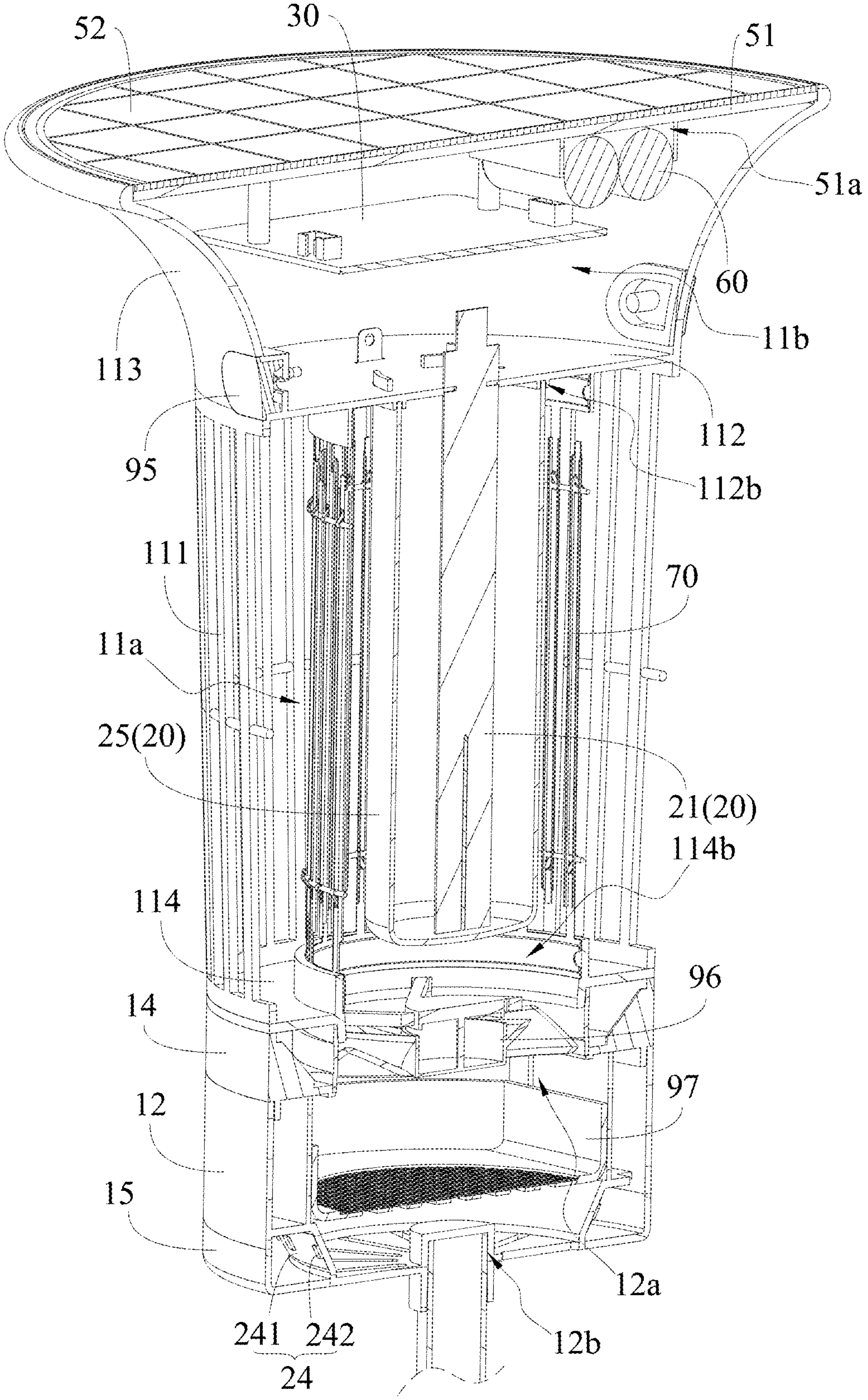
FIG. 26 is a partially cross sectional view the mosquito killer of FIG. 22.
Figure 27:
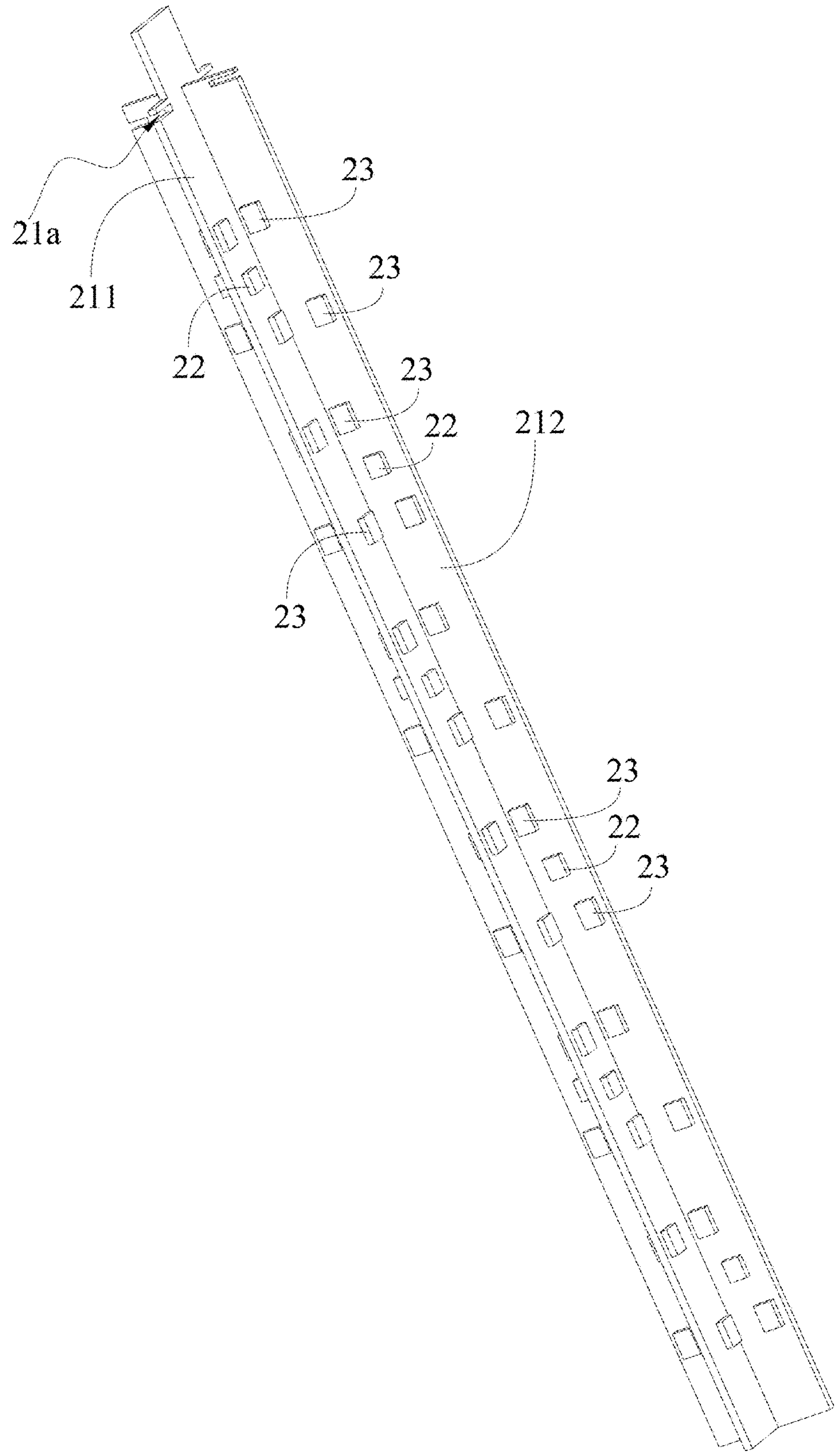
FIG. 27 shows the first circuit board of the mosquito killer according to a second embodiment of the present disclosure.
Figure 28:
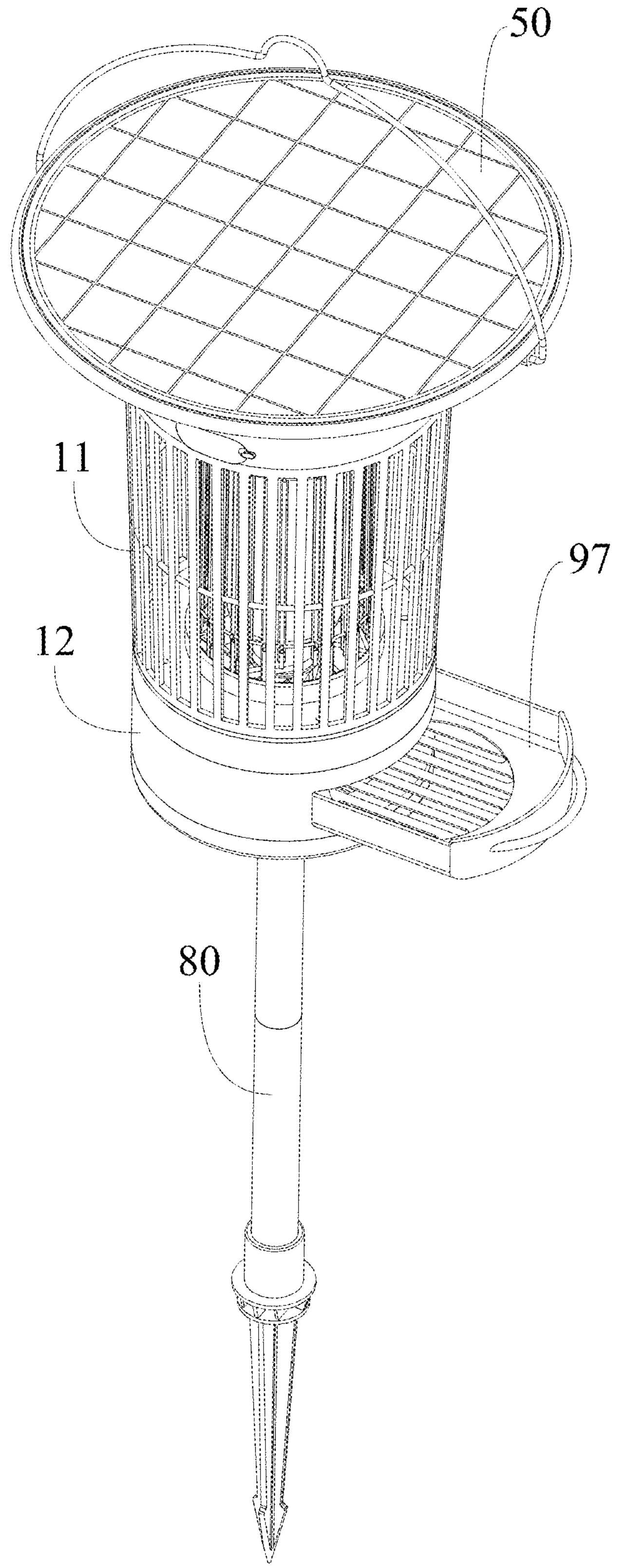
FIG. 28 is further another schematic view of the mosquito killer according to a second embodiment of the present disclosure.
Figure 29:
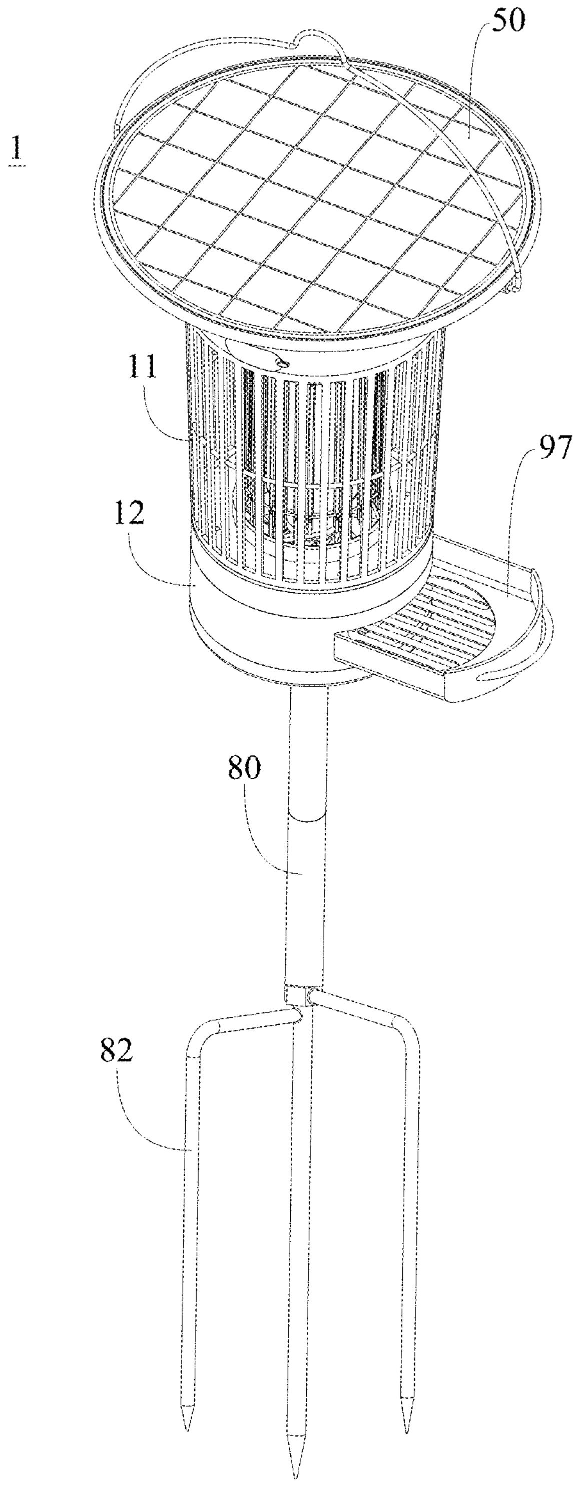
FIG. 29 shows another grounding structure according to a second embodiment of the present disclosure, which includes a first grounding component and second grounding component.
Figure 30:
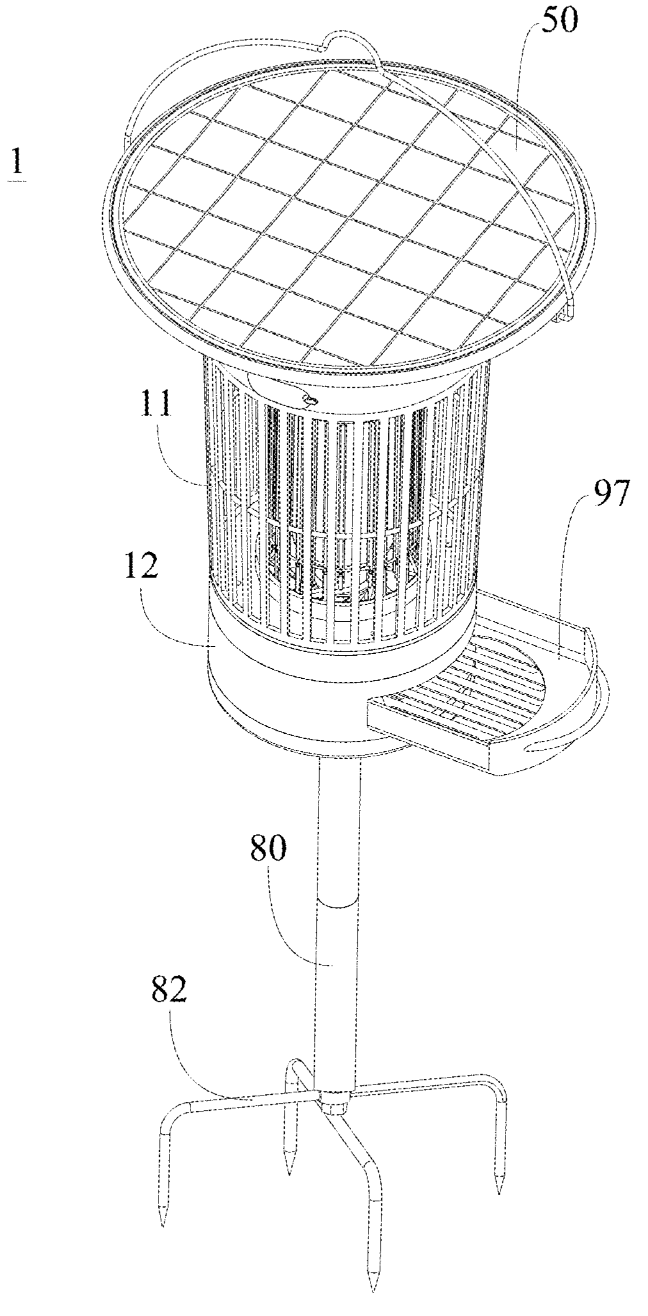
FIG. 30 shows further another grounding structure according to a second embodiment of the present disclosure, which includes a third grounding component and fourth grounding component.
Figure 31:
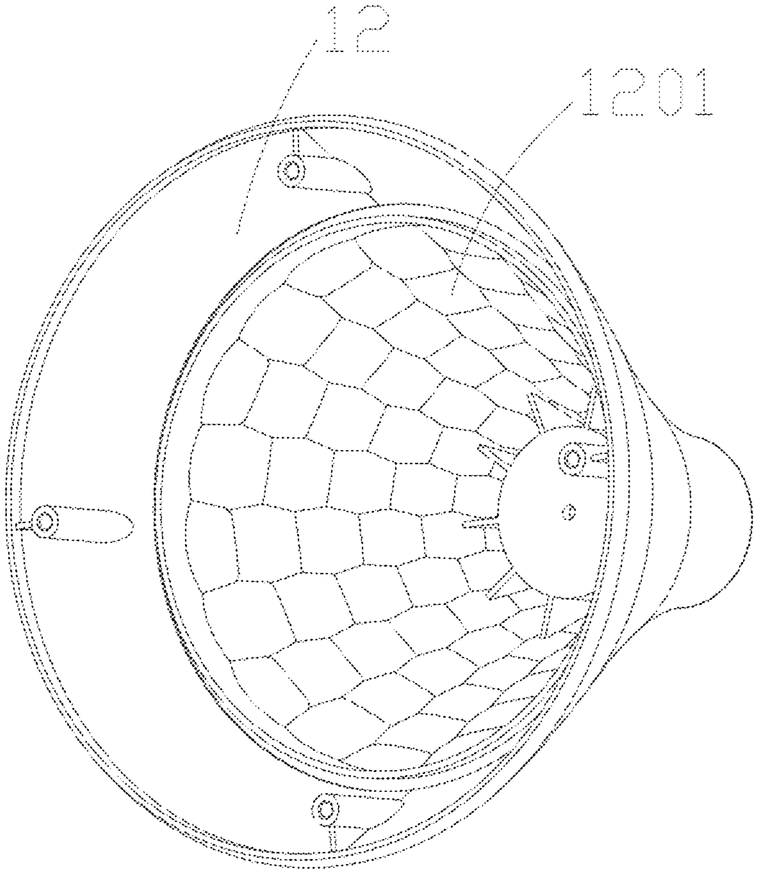
FIG. 31 shows a base of the housing of the mosquito killer according to a modified embodiment of present disclosure.

As shown in FIGS. 18 and 19, the grounding structure 82 includes a first grounding component 823 and a second grounding component 824. The first grounding component 823 includes a main pin 8231 and a first L-shaped auxiliary pin 8232. The top of the main pin 8231 is provided with an external thread 8231*a*, and one end of the first L-shaped auxiliary pin 8232 is fixedly connected to the main pin 8231. The second grounding component 824 includes a first nut 8241 and a second L-shaped auxiliary pin 8242, and one end of the second L-shaped auxiliary pin 8242 is fixedly connected to the first nut 8241. The first nut 8241 is connected to the external thread 8231*a* at the top of the main pin 8231 to connect the first grounding component 823 and the second grounding component 824. As a whole, the external thread 8213*a* at the top of the main pin 8231 is used to connect with the mounting hole thread of the frame component. As shown in FIGS. 19 and 20, the grounding structure 82 includes a third grounding component 825 and a fourth grounding component 826. The third grounding component 825 includes a U-shaped pin 8251 and a screw 8252, which are fixedly connected to the U-shaped pin 8251. The fourth grounding component 826 includes a third L-shaped auxiliary pin 8261, a fourth L-shaped auxiliary pin 8262, and a second nut 8263. The third L-shaped auxiliary pin 8261 and the fourth L-shaped auxiliary pin 8262 are located on both sides of the second nut 8263, and one end of the third L-shaped auxiliary pin 8261 and one end of the fourth L-shaped auxiliary pin 8262 are fixedly connected to the second nut 8263. The second nut 8263 is connected to the screw 8252 to integrate the fourth grounding component 826 and the third grounding component 825, and the screw 8252 is used for threaded connection with the mounting hole of the frame component.

As shown in FIG. 6, the mosquito killer 1 also includes a power supply interface component 94, which is electrically connected to the second circuit board 30 mentioned above. The power supply interface component 94 can be exposed through the opening on the side plate 113 to connect to an external power source, so that the external power source can charge the energy storage battery 60 through the power supply interface component 94. The power supply interface component 94 can be a USB interface or a Type-C interface. A protective cap 95 can also be detachably connected to the power supply interface component 94, and the protective cap 95 can have an identification pattern on it to display the type of power supply interface component 94, such as USB type interface components, such as Type-C interface components.

Second Embodiment

Please refer to FIGS. 22 to 30; the second embodiment of the present application provides a mosquito killer 1. It should be noted that the mosquito killer 1 in the second embodiment of the present application is structurally similar to the mosquito killer 1 in the first embodiment of the present application (and can refer to the introduction in the first embodiment). The following only focuses on the differences between the mosquito killer 1 in the second embodiment and the mosquito killing device 1 in the first embodiment.

The lampshade 11 includes a grille 111, an upper base 112, and side panel 113. The grille 111 is arranged around the circumference of the upper base 112 and connected to it to enclose the first accommodating cavity 11*a*, while the side panel 113 are arranged around the circumference of the upper base 112 and connected to it to enclose the second accommodating cavity 11*b*. The upper base 112 has a socket hole 12*a* that connects the first accommodating cavity 11*a* and the second accommodating cavity 11*b*. The first and second sub circuit boards 211 and 212 are inserted into the socket hole 12*a* at one end close to the upper base 112, and the first and second sub circuit boards 211 and 212 are equipped with a clamping slot 21*a* that is engaged with the upper base 112 at the end close to the upper base 112.

The second circuit board 30 is connected to the seat body 51 of the photovoltaic module 50 by locking screws. The side of the seat body 51 facing away from the photovoltaic panel 52 is provided with a battery installation groove 51, and the energy storage battery 60 is placed in the battery installation groove 51 and electrically connected to the second circuit board 30. It should be noted that the shell component 10 of the mosquito killing device 1 in second embodiment 2 does not include the fixing seat 13 in first embodiment, and the energy storage battery 60 is directly installed in the battery installation slot 51 of the seat body 51 of the photovoltaic module 50.

The lampshade 11 also includes a lower base 114, which is connected to one end of the grille 111 away from the upper base 112. The mounting seat 1122 of the upper base 112 also has a first slot 112*b* for inserting one end of the diffusion cover 25, which is spaced apart from the lower base 114 at the end of the diffusion cover 25 away from the upper base 112.

The lower base 114 is equipped with an air inlet 114*b*, and the housing assembly 10 also includes a fan base 14. The fan base 14 is located on the side of the lower base 114 away from the upper base 112 and connected to the lower base 114. The mosquito killer 1 also includes a fan body 96, which is installed on the fan base 14, and the air inlet side of the fan body 96 corresponds to the air inlet 114*b*. The shell component 10 also includes a base 12, which is located on the side of the fan base 14 away from the lower base 114 and connected to the fan base 14. The mosquito killer 1 also includes a collection box 97, which can be detachably stored in the third accommodating chamber 12*a* of the base 12. The collection box 97 has a storage state stored in the third accommodating chamber 12*a* of the base 12. At this time, the opening of the collection box 97 corresponds to the air outlet side of the fan body 96, and the collection box 97 also has an extended state outside the third accommodating chamber 12*a* of the base 12. By designing the fan body 96, the fan blades of the fan body 96 rotate to guide mosquitoes approaching the mosquito lure lamp 22/flame lamp 23 into the collection box 97 under the action of the airflow formed by the fan blades. By designing the collection box 97 to be detachable from the base 12, users can clean the mosquitoes inside the collection box 97 according to their actual needs. Both the mosquito lure lamp 22 and the flame lamp 23 can attract mosquitoes. When it is necessary to kill mosquitoes, turn on the fan body 96. The fan body 96 can drive the air around the lampshade 11 to flow. When mosquitoes approach the mosquito lure lamp 22 or the flame lamp 23, they will be sucked into the air inlet 114*b* by the airflow and eventually fall into the collection box 97. As long as the fan body 96 continues to work, mosquitoes will stay in the collection box 97 under the drive of the airflow.

It should be noted that the mosquito killer 1 in the second embodiment does not include the motor 41 and optical element 42 in the first embodiment, but the light emitting assembly 20 also includes a light emitting unit 24, which includes a third circuit board 241 and an ambient light 242. At this time, the third circuit board 241 is installed on the base 12, and the third circuit board 241 is ring-shaped. The number of ambient lights 242 is multiple, and multiple ambient lights 242 are arranged at intervals on the ring-shaped third circuit board 241 and electrically connected to it. The housing component 10 also includes another diffusion cover 15 with transparency, which is located on the side of the base 12 away from the fan base 14 and connected to the base 12. The diffusion cover 15 is covered with an ambient light 242, and the light emitted by the ambient light 242 can pass through the other diffusion cover 15 to make the bottom of the housing component 10 emit light. It should be noted that the mosquito killing device 1 in the second embodiment also has an ambient light mode, but since the mosquito killer 1 in the second embodiment does not include the motor 41 and optical element 42 in the first embodiment, the light projected by the ambient light 242 will not exhibit the dynamic effect in the first embodiment.

Please refer to FIGS. 1-8 and 31, in one modified embodiment of the present application, multiple optical units 1201 can be directly arranged on the surface of the base 12. These optical units 1201 are connected in sequence, with each unit having an arc-shaped surface designed to process light from the light emitting unit 24 or the optical element 42 to form a projection light. The arc-shaped surface of each optical unit 1201 is a convex arc surface, which protrudes toward the side where the light emitting unit 24 is located. At least a portion of the outer diameter of the base 12 gradually decreases along a first direction, which is the direction from the lampshade toward the base (i.e., from top to bottom). It can be understood that in this modified embodiment, the surface of the base 12 can directly integrate at least one optical unit to process light from the light emitting unit 24 or the optical element 42, forming projection light. This not only achieves superior lighting effects but also reduces the number of components and facilitates assembly.

It is understandable that the above detailed description covers several embodiments of the mosquito killers 1. However, it is also conceivable that in some modified embodiments, a lighting fixture can be provided, which may include the aforementioned flame lamp 23 and light emitting unit 24 but may omit the mosquito trap lamp 22. Consequently, the aforementioned lighting fixture can achieve the effects of both a flame lamp and a projection lamp. Specifically, when equipped with a photovoltaic panel as a solar-powered courtyard lamp for outdoor use, it not only promotes energy efficiency and environmental sustainability but also delivers dual lighting effects—flame lamp and projection lamp—resulting in a high level of user experience.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A mosquito killer, comprising:

a housing, comprising a lampshade and a base with transparency, the lampshade providing a first accommodating chamber, the base being arranged at a bottom of the lampshade; and a light emitting assembly, comprising a first circuit board, a mosquito trap lamp, and a light emitting unit, wherein at least a portion of the first circuit board is located within the first accommodating chamber, the mosquito trap lamp is mounted on the first circuit board and is capable of emitting a light of a predetermined wavelength to attract mosquitoes, the light emitting unit is located in the base and is configured to emit a projection light projected towards the base to form a projection lamp effect;

wherein the lampshade further provides a second accommodating chamber, the mosquito killer further comprises a second circuit board, and the second circuit board is at least partially located within the second accommodating chamber; the second circuit board is a driving board that drives the light emitting assembly to emit light;

the mosquito killer further comprises a photovoltaic module and an energy storage battery, the photovoltaic module includes a seat body and a photovoltaic panel; the seat body is located at a top of the lampshade and is connected to the lampshade; the photovoltaic panel is installed on a side of the seat body facing away from the lampshade, and is electrically connected to the second circuit board;

the energy storage battery is located in the second accommodating chamber and electrically connected to the second circuit board.

2. The mosquito killer according to claim 1, further comprising a power supply interface component, which is electrically connected to the second circuit board; the power supply interface component is exposed on a side panel of the lampshade, and configured to be connected to an external power source, so that the external power source charges the energy storage battery through the power supply interface component.

3. The mosquito killer according to claim 1, wherein the light emitting assembly further comprises a diffusion cover connected to the lampshade, the diffusion cover having translucency, and the diffusion cover is located in the first accommodating cavity and surrounds the first circuit board, and the mosquito trap lamp.

4. The mosquito killer according to claim 1, further comprising an electric grid located in the first accommodating chamber and connected to the lampshade; the electric grid comprises a positive electrode body, a negative electrode body, and at least one connecting strip; the positive electrode body comprises a positive electrode connecting part and multiple positive electrode strip-shaped parts sequentially connected to the positive electrode connecting part; the negative electrode body comprises a negative electrode connecting part and multiple negative electrode strip-shaped parts sequentially connected to the negative electrode connecting part; the multiple positive electrode strip-shaped parts and the multiple negative electrode strip-shaped parts are alternately arranged at intervals and located between the positive electrode connecting part and the negative electrode connecting part; the at least one connecting strip connects the multiple positive electrode strip-shaped parts and the multiple negative electrode strip-shaped parts together.

5. The mosquito killer according to claim 1, wherein the light emitting assembly further comprises a flame lamp, which is set in the first accommodating chamber and configured to light up in a preset manner.

6. The mosquito killer according to claim 5, wherein the mosquito trap lamp comprises a UV LED lamp for emitting ultraviolet light;

the light emitting unit comprises an LED lamp for emitting monochromatic light or colored light; and/or the flame lamp comprises an LED lamp for emitting monochromatic or colored light.

7. The mosquito killer according to claim 1, wherein the lampshade further comprises a lower base, wherein the first circuit board and the mosquito trap lamp are located above the lower base, and a bottom of the lower base is fixedly connected to the base;

the mosquito killer further comprises a motor and an optical element in a sheet with ripples and/or patterns, wherein the motor and the optical element are located in an accommodating chamber of the base, and a rotating shaft of the motor is connected to the optical element;

the light emitting unit is configured to project light onto the optical element; the motor is configured to drive the optical element to move, to allow the projection light formed by the light emitting unit after passing through the optical element and the base to have a dynamic projection effect.

8. The mosquito killer according to claim 7, wherein a surface of the base or an inner shell located in the base has at least one optical unit, which has an arc-shaped surface and is used to process light from the light emitting unit or the optical element to form the projection light; the arc-shaped surface is a curved convex surface, which protrudes towards a side where the light emitting unit is located; at least a portion of an outer diameter of the base or the inner shell gradually decreases along a first direction in which the lampshade faces the base.

9. The mosquito killer according to claim 1, wherein a bottom of the housing is provided with an installation hole, and the mosquito killer further comprises a support component; one end of the support component is used to connect with the installation hole, and the other end of the support component is used to connect with an external carrier; and the support component comprises a support column and a grounding structure; a top end of the support column is used to connect with the installation hole, and a bottom end of the support column is connected to the grounding structure.

10. The mosquito killer according to claim 9, wherein the grounding structure comprises a first grounding component and a second grounding component; the first grounding component comprises a main pin and a first L-shaped auxiliary pin; a top of the main pin is provided with an external thread, and one end of the first L-shaped auxiliary pin is fixedly connected to the main pin;

the second grounding component comprises a first nut and a second L-shaped auxiliary pin, and one end of the second L-shaped auxiliary pin is fixedly connected to the first nut; the first nut is connected to the external thread at the top of the main pin, so that the first grounding component and the second grounding component are connected as a whole, and the external thread is used to connect with the installation hole.

11. The mosquito killer according to claim 9, wherein the grounding structure comprises a third grounding component and a fourth grounding component; the third grounding component includes a U-shaped pin and a screw, which is fixedly connected to the U-shaped pin; the fourth grounding component includes a third L-shaped auxiliary pin, a fourth L-shaped auxiliary pin, and a second nut; the third L-shaped auxiliary pin and the fourth L-shaped auxiliary pin are located on two sides of the second nut, and one end of the third L-shaped auxiliary pin and one end of the fourth L-shaped auxiliary pin are fixedly connected to the second nut; the second nut is connected to the screw to connect the fourth L-shaped auxiliary pin; the grounding component and the third grounding component are connected as a whole, and the screw is used for threaded connection with the installation hole.

12. A mosquito killer, comprising:

a housing, comprising a lampshade and a shell with transparency, the lampshade providing first accommodating chamber, the shell being arranged at a side of the lampshade; and a light emitting assembly, comprising a first circuit board, a mosquito trap lamp, and a light emitting unit, wherein at least a portion of the first circuit board is located within the first accommodating chamber, the mosquito trap lamp is mounted on the first circuit board and is capable of emitting light of a predetermined wavelength to attract mosquitoes, the light emitting unit is located in the shell and is used to emit projection light projected towards the shell to form a projection light effect;

wherein the lampshade further provides a second accommodating chamber, the mosquito killer further comprises a second circuit board, and the second circuit board is at least partially located within the second accommodating chamber; the second circuit board is a driving board that drives the light emitting assembly to emit light;

the mosquito killer further comprises an energy storage battery, the energy storage battery is located in the second accommodating chamber and electrically connected to the second circuit board.

13. The mosquito killer according to claim 12, wherein the mosquito killer further comprises a motor and an optical element in a sheet with ripples and/or patterns, wherein the motor and the optical element are located in an accommodating chamber of the shell, and a rotating shaft of the motor is connected to the optical element;

the light emitting unit is configured to project light onto the optical element; the motor is configured to drive the optical element to move, to allow the projection light formed by the light emitting unit after passing through the optical element and the shell to have a dynamic projection effect.

14. A mosquito killer, comprising:

a housing, comprising a lampshade, and a base with transparency, the base being arranged at a side of the lampshade; and a light emitting assembly, comprising a first circuit board, a mosquito trap lamp, and a light emitting unit, wherein at least a portion of the first circuit board is located within the lampshade, the mosquito trap lamp is mounted on the first circuit board and is capable of emitting light of a predetermined wavelength to attract mosquitoes, the light emitting unit is used to emit projection light projected towards the base to form a projection light effect;

wherein the mosquito killer further comprises a second circuit board, and the second circuit board is at least partially located within the lampshade; the second circuit board is a driving board that drives the light emitting assembly to emit light;

the mosquito killer further comprises a photovoltaic module, the photovoltaic module includes a seat body and a photovoltaic panel, the seat body is located at a top of the lampshade and is connected to the lampshade, the photovoltaic panel is installed on a side of the seat body facing away from the lampshade, and is electrically connected to the second circuit board.

15. The mosquito killer according to claim 14, wherein the base is fixed on the lampshade;

the mosquito killer further comprises a motor, and an optical element in a sheet with ripples and/or patterns, wherein the motor and the optical element are located within the base, and a rotating shaft of the motor is connected to the optical element;

the light emitting unit is configured to project light onto the optical element, the motor is configured to drive the optical element to move, to allow the projection light formed by the light emitting unit after passing through the optical element and the base to have a dynamic projection effect.

* * * * *